United States Patent
Nagashima

(10) Patent No.: US 7,685,318 B2
(45) Date of Patent: Mar. 23, 2010

(54) ELECTRONIC DEVICE AND CONTROL METHOD THEREOF

(75) Inventor: Nao Nagashima, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1859 days.

(21) Appl. No.: 10/742,205

(22) Filed: Dec. 18, 2003

(65) Prior Publication Data

US 2004/0145973 A1    Jul. 29, 2004

(30) Foreign Application Priority Data

Dec. 20, 2002 (JP) .............................. 2002-370427
Feb. 20, 2003 (JP) .............................. 2003-042883
Oct. 30, 2003 (JP) .............................. 2003-370586

(51) Int. Cl.
    *G06F 15/16* (2006.01)
(52) U.S. Cl. ....................................... 709/248; 709/203
(58) Field of Classification Search ................. 709/203, 709/217, 219, 248
    See application file for complete search history.

(56) References Cited

U.S. PATENT DOCUMENTS

| 6,219,303 | B1* | 4/2001 | Morohoshi et al. ............ 368/47 |
| 2002/0169837 | A1* | 11/2002 | Taranath et al. ............. 709/206 |
| 2004/0003123 | A1* | 1/2004 | Kwon ......................... 709/248 |

FOREIGN PATENT DOCUMENTS

| JP | 08-016528 | 1/1996 |
| JP | 2000-131471 | 5/2000 |

* cited by examiner

*Primary Examiner*—Nathan Flynn
*Assistant Examiner*—Jeong S Park
(74) *Attorney, Agent, or Firm*—Canon U.S.A., Inc., IP Division

(57) ABSTRACT

In a device having a capability of using time data acquired from an external time information generator, a notification unit notifies a user of time information. The notification unit also notifies the user whether the notified time information is based on time data acquired from the external time information generator. Processing performed by the device is restricted depending on a status associated with time information. Although some types of processing are allowed when the device is in a status in which the time information is based on the time data acquired from the external time information generator, the same type of processing are disabled when the device is in any other status associated with time information.

7 Claims, 27 Drawing Sheets

| Job ID | Send/Receive | STS | Date & Time |
|---|---|---|---|
| 0001 | Send | 0 | 0000.00.00 00 : 00 : 00 |
| 0002 | Send | 1 | 2002.07.18 12 : 30 : 30 |
| 0003 | Receive | 1 | 2002.07.18 15 : 10 : 10 |
| 0004 | Receive | 2 | 2002.07.19 07 : 11 : 00 |
| 0005 | Send | 2 | 2002.07.20 12 : 09 : 07 |
| 0006 | Reveive | 2 | 2002.07.24 19 : 02 : 50 |
| 0007 | Receive | 2 | 2002.07.27 21 : 10 : 12 |
| 0008 | Send | 2 | 2002.07.30 05 : 20 : 30 |
| 0009 | Send | 3 | 2002.08.12 09 : 22 : 20 |
| 0010 | Receive | 2 | 2002.08.19 10 : 22 : 20 |

FIG. 13

| First condition | Second condition | | Restriction |
|---|---|---|---|
| MD = 0 | For any value (0, 1, 3) of STS | | All operation modes including an external reception/print mode and an external transmission mode are permitted |
| MD = 1 | STS = 0 | | Only the external reception/print mode is permitted, and any other mode (including the external transmission mode) is prohibited. |
| | STS = 1 | | |
| | STS = 3 | | |
| | STS = 2 | | All operation modes including the external reception/print mode and any other mode (including the external transmission mode) are permitted. |
| MD = 2 | STS = 0 | | The external transmission mode is permitted, but any other mode (including the external reception/print mode) is prohibited. |
| | STS = 1 | | |
| | STS = 3 | | |
| | STS = 2 | | All operation modes including the external transmission mode and any other mode (including the external reception/print mode) are permitted. |

1300

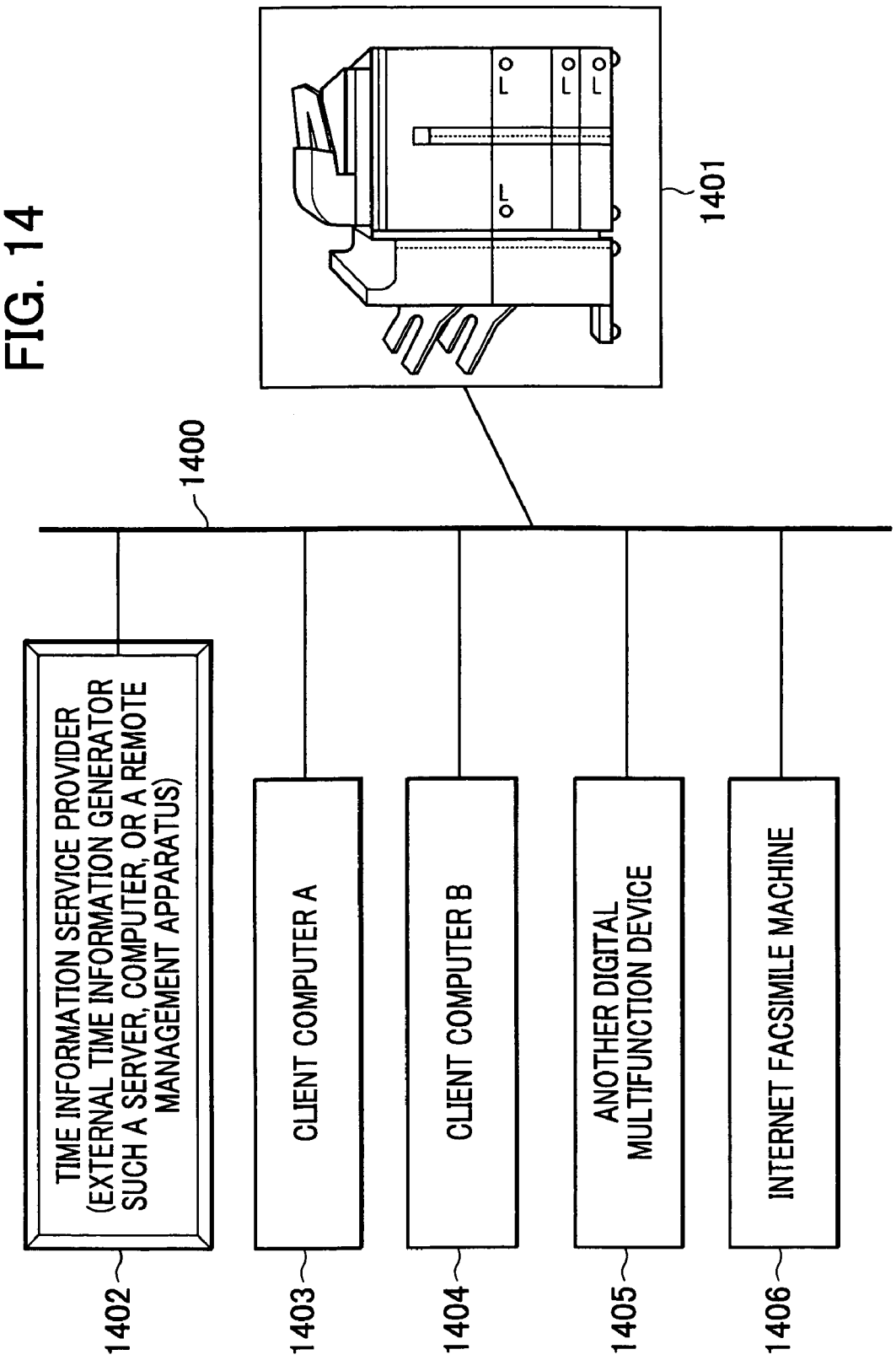

| Operation Mode | Items | 1st state | 2nd state | 3rd state | 4th state |
|---|---|---|---|---|---|
| Copy mode | Single/both-sided printing | ○ | ○ | ○ | ○ |
| | Sort mode | ○ | ○ | ○ | ○ |
| | Staple mode | ○ | ○ | ○ | ○ |
| | Scaled-down layout (N in 1) mode | ○ | ○ | ○ | ○ |
| | Scaled-up layout (1 to N) mode | ○ | ○ | ○ | ○ |
| | Image processing mode | ○ | ○ | ○ | ○ |
| | Stamp mode | ○ | ○ | ○ | ○ |
| | Binding margin mode | ○ | ○ | ○ | ○ |
| | . | . | . | . | . |
| | . | . | . | . | . |
| Transmission/facsimile mode | Normal facsimile transmission | ○ | ○ | ○ | △ |
| | Extended facsimile transmission mode | △ | ○ | ○ | × |
| | e-mail transmission | △ | △ | ○ | △ |
| | Internet facsimile transmission | △ | ○ | ○ | △ |
| | Store in box | ○ | ○ | ○ | △ |
| | Timer transmission | × | ○ | ○ | × |
| | Direct transmission | ○ | ○ | ○ | △ |
| | Job completion notification | × | ○ | ○ | × |
| | Normal reception | ○ | ○ | ○ | ○ |
| | Extended reception | △ | ○ | ○ | × |
| | Timer reception | × | ○ | ○ | × |
| | Communication management report | × | △ | ○ | × |
| | . | . | . | . | . |
| Printer mode | Single/both-sided printing | ○ | ○ | ○ | ○ |
| | Sort mode | ○ | ○ | ○ | ○ |
| | Staple mode | ○ | ○ | ○ | ○ |
| | Scaled-down layout (N in 1) mode | ○ | ○ | ○ | ○ |
| | Scaled-up layout (1 to N) mode | ○ | ○ | ○ | ○ |
| | Edit mode | ○ | ○ | ○ | ○ |
| | Watermark | ○ | ○ | ○ | ○ |
| | Secure print job | × | ○ | ○ | × |
| | Hold job | △ | ○ | ○ | × |
| | Test print job | ○ | ○ | ○ | ○ |
| | . | . | . | . | . |
| | . | . | . | . | . |
| Box mode | Read into box with no password | ○ | ○ | ○ | ○ |
| | Read into box with password | ○ | ○ | ○ | ○ |
| | Output from box with no password | ○ | ○ | ○ | ○ |
| | Output from box with password | △ | ○ | ○ | × |
| | Automatic delete | × | ○ | ○ | × |
| | Single/both-sided printing | ○ | ○ | ○ | ○ |
| | Sort mode | ○ | ○ | ○ | ○ |
| | Staple mode | ○ | ○ | ○ | ○ |
| | . | . | . | . | . |
| | . | . | . | . | . |
| . | . | . | . | . | . |
| . | . | . | . | . | . |
| . | . | . | . | . | . |
| Setting of items common for all modes | Display of job history | × | △ | ○ | △ |
| | . | . | . | . | . |
| | . | . | . | . | . |

PRINT

PRINTER
PRINTER NAME (N): IMAGE FORMING APPARATUS 1401 ▼  [PROPERTIES (P)]
DEVICE STATUS: IDLE
TIME INFORMATION: 2002 11/17 8:30:45
MANUALLY SET  — 2001a
☐ OUTPUT TO FILE (L)

PAGE RANGE TO PRINT
⦿ ALL (A)      ○ SELECTED AREA (S)
○ CURRENT PAGE (E)   [        ]
○ SPECIFIED PAGES (G)
ENTER PAGE NUMBERS OR PAGE RANGES
SEPARATED BY COMMAS. FOR EXAMPLE, 1, 3, 6, 4-8

COPIES
NUMBER OF COPIES (C): [1]
☑ COLLATE (T)

ZOOM
PAGES PER SHEET (H): 1 PAGE ▼
SCALE TO PAPER SIZE (Z): NO SCALING ▼

PRINT WHAT (W): DOCUMENT ▼
PRINT (R): ALL PAGES ▼

[OPTIONS (Q)...]       [OK]   [CLOSE]

STORAGE MEDIUM SUCH AS AN FD OR A CD-ROM

| DIRECTION INFORMATION |
|---|
| FIRST DATA PROCESSING PROGRAM PROGRAM CODES CORRESPONDING TO STEPS IN A FLOW CHART SHOWN IN FIG. 2 |
| SECOND DATA PROCESSING PROGRAM PROGRAM CODES CORRESPONDING TO STEPS IN A FLOW CHART SHOWN IN FIG. 7 |
| THIRD DATA PROCESSING PROGRAM PROGRAM CODES CORRESPONDING TO STEPS IN A FLOW CHART SHOWN IN FIG. 8 |
| FOURTH DATA PROCESSING PROGRAM PROGRAM CODES CORRESPONDING TO STEPS IN A FLOW CHART SHOWN IN FIG. 11 |
| FIFTH DATA PROCESSING PROGRAM PROGRAM CODES CORRESPONDING TO STEPS IN A FLOW CHART SHOWN IN FIG. 12 |
|  |

MEMORY MAP OF STORAGE MEDIUM

ELECTRONIC DEVICE AND CONTROL METHOD THEREOF

BACKGROUND OF THE INVENTION

1. Field of the Invention

The present invention relates to an electronic device having a capability of communicating with a server that provides time information service via a communication medium such as a network. The present invention also relates to a device, information processing apparatus, and an image forming apparatus, having a capability of using time data supplied from an external time information generator. Furthermore, the present invention relates to a method of controlling such a device or apparatus, method of controlling displaying information, a method of operating such a device or apparatus, a storage medium, and a program.

2. Description of the Related Art

It is known in the art to calibrate an internal clock disposed in an apparatus by using time information supplied from an external device, such as time information provided via the Internet, time information provided using a radio wave, or time information provided by broadcasting (further detailed information may be found, for example, in Japanese Patents Laid-Open Nos. 8-16528 and 2000-131471).

A large number of apparatuses are known which use such time information service. However, most of those apparatuses use time information service simply for the purpose of calibration of their internal clock and do not use time information service in further useful manners.

Nowadays, we have to deal with a great number of pieces of digital information. In dealing with such a large number of pieces of digital information, it is needed to manage the date/time at which each piece of digital information has been produced or changed. When there is a plurality of versions for certain digital data, date/time information is useful to retrieve latest data.

In many apparatuses, the capability of automatically calibrating the internal clock using time information provision service allows a reduction in burdon on users to adjust time. However, there are some problems to be solved in order to achieve higher reliability of date/time information.

Some apparatuses using time information provision service have a capability of allowing users to manually set date/time information used by apparatuses, but some apparatuses do not have such a capability. Even if an apparatus has a capability of allowing a user to manually set date/time, the date/time manually set by the user is not necessarily accurate, because there is a possibility that the date/time is incorrectly set either by mistake or intentionally. Thus, the apparatus operates in a status in which the date/time information cannot be guaranteed, until the date/time is set using time information provision service.

If the time information provision service becomes unavailable for a long period for some reason, there is a possibility that the error of the internal clock of the apparatus becomes too large during that period.

In the conventional techniques, devices are designed simply to achieve high accuracy in controlling the operation of devices. However, in order to properly use such a device designed to operate on the basis of accurate time information using the time information provision service, a user has to have sufficient knowledge of how to use it. Even in such an apparatus, problems can occur if the time information provision service becomes unavailable for some reason (or if the time information provision service is not used although the service is available). In such a situation, a user will be confused about what to do. Devices are not designed taking into account the possibility that such a problem can occur, and devices do not have capability of dealing with such possible problems, which may be solved by disabling some or all of functions of devices during the period in which the time information provision service is unavailable.

The capabilities or functions of devices using time information provision service vary from one device to another. For example, in a case of an image forming apparatus using time information provision service, the design thereof can be made in many ways. For example, in design of an image forming apparatus, a capability of using time information provision service may be simply added to image forming apparatus, or various capabilities of the image forming apparatus may be optimized so that users can user the image forming apparatus in a more convenient manner and so that the image forming apparatus can operate in a more reliable manner. That is it is needed to design devices from the above point of view, to provide devices that can be used by users in more convenient and reliable manners in various environmental conditions.

That is, when a device or a system using time information service is designed, it is needed to more closely analyze the above-described problems that can occur in actual usage of the device, and it is needed to design the device such the above-described requirements are met.

SUMMARY OF THE INVENTION

In view of the above, it is an object of the present invention to provide an electronic device and a control method thereof, a device and a control method thereof, an information processing apparatus and a control method thereof, an image forming apparatus and an operation method thereof, and a program and a storage medium, which do not have problems similar to those the conventional techniques have.

More specifically, it is an object of the present invention to solve the problems in the conventional techniques and to provide an electronic device and a control method thereof, a device and a control method thereof, an information processing apparatus and a control method thereof, an image forming apparatus and an operation method thereof, and a program and a storage medium, which can be easily used by a user in a convenient manner on the basis of time information acquired via time information provision service, and which have a capability of dealing with problems that may occur during actual operations.

Another object of the present invention is to solve the problems in the conventional techniques and to provide an electronic device and a control method thereof, a device and a control method thereof, an information processing apparatus and a control method thereof, an image forming apparatus and an operation method thereof, and a program and a storage medium, which use time information provision service and which have a capability of informing a user of a status associated with setting of time and accuracy of time information, whereby processing of job data specified by the user is enabled or disabled depending on the status associated with time information, and thus highly convenient data processing environment is provided to the user.

In addition, it is another object of the present invention to provide a technique of informing a user whether time information provision service is properly used, and restricting the operation when the time information provision service is not properly used.

In addition, it is another object of the present invention to provide a technique of, without restricting operations, storing log data indicating operation history together with history of status associated with date/time information, thereby making it possible to make judgment, later, as to the reliability of date/time.

In addition, it is another object of the present invention to provide a technique of, when communication is performed between two devices having a capability of setting time using time information provision service, comparing time information used by a first device with time information used by a second device, and employing time information that is more reliable thereby making it possible to perform data processing on the basis of accurate time information by evaluating whether time information is reliable enough each time communication with another device is performed.

In an aspect, the present invention provides an electronic device having a capability of performing data communication with a server that provides date/time information provision service, comprising display means for displaying time information, time measurement means for measuring time on the basis of first time information acquired via the date/time information provision service or on the basis of second time information set by a user, storage means for storing data indicating a time-setting status of the time measurement means, display control means for displaying, on a display, the time-setting status according to the data stored in the storage means, and process control means for controlling execution of particular data processing, in accordance with the time-setting status displayed by the display control means.

In another aspect, the present invention provides a method of controlling an electronic device having a capability of performing data communication with a server that provides date/time information provision service, comprising the step of displaying time information on display means, measuring time using time measurement means on the basis of first time information acquired via the date/time information provision service or on the basis of second time information set by a user, storing, by using storage means, data indicating a time-setting status of the time measurement means, displaying the time-setting status by using display control means, according to the data stored in the storage means, and controlling execution of particular data processing, in accordance with the time-setting status displayed by the display control means.

In another aspect, the present invention provides an electronic device having a capability of performing data communication with a server that provides date/time information provision service or with a second electronic device that performs particular processing, comprising display means for displaying time information, time measurement means for measuring time on the basis of first time information acquired via the date/time information provision service or on the basis of second time information set by a user, storage means for storing data indicating a time-setting status of the time measurement means, acquisition means for acquiring a reference time setting status stored in the second electronic device, and control means for comparing the time-setting status with the reference time setting status acquired by the acquisition means and resetting the time-setting status to be stored in the storage means, in accordance with the result of the comparison.

In another aspect, the present invention provides a method of controlling an electronic device including display means for displaying time information and having a capability of performing data communication with a server that provides date/time information provision service or with a second electronic device that performs particular processing, comprising the steps of measuring time on the basis of first time information acquired via the date/time information provision service or on the basis of second time information set by a user, storing, in storage means, data indicating a time-setting status in the time measurement step, acquiring a reference time setting status stored in the second electronic device, and performing control processing including the steps of comparing the time-setting status with the reference time setting status acquired by the acquisition means and resetting the time-setting status to be stored in the storage means, in accordance with the result of the comparison.

In another aspect, the present invention provides a method of controlling a device including a notification unit for notifying a user of time information, suitable for performing processing at least in one of a plurality of operation modes, comprising a time information control step in which the notification unit notifies the user of time information, and a notification information control step in which the notification unit provides notification information to the user to notify whether the time information supplied to the user by the notification unit is based on time data generated by an external time information generator.

In another aspect, the present invention provides a method of controlling a device including an acquisition unit for acquiring time data from an external time information generator, suitable for performing processing at least in one of a plurality of operation modes, comprising a processing step in which specified job data is processed using a processing unit, and a process restriction control step in which the processing unit is controlled such that the processing unit is enabled to execute processing of job data when the device is currently in a status in which the time information used by the device is based on time data acquired from the external time information generator, but the processing unit is disabled to execute the same processing of job data when the device is currently in any status different from the former status.

In another aspect, the present invention provides a device including a notification unit for notifying a user of time information, suitable for performing processing at least in one of a plurality of operation modes, comprising an acquisition unit adapted to acquire time data from an external time information generator, and a notification control unit for controlling the notification unit so as to notify the user whether the time information supplied to the user by the notification unit is based on time data generated by an external time information generator.

In another aspect, the present invention provides a device capable of processing specified job data using a processing unit and suitable for performing processing at least in one of a plurality of operation modes, comprising an acquisition unit for acquiring time data from an external time information generator, and a process restriction control unit for controlling the processing unit such that the processing unit is enabled to execute processing of job data when the device is currently in a status in which the time information used by the device is based on time data acquired from the external time information generator, but the processing unit is disabled to execute the same processing of job data when the device is currently in any status different from the former status.

In another aspect, the present invention provides a program for implementing a method of controlling a device.

In an aspect, the present invention provides a display control method for an information processing apparatus having a plurality of operation modes and capable of using time information, the method comprising a display control step in which status information indicating the status of the information processing apparatus is displayed on a display, and a notification information control step in which notification information is displayed on the display to notify a user whether time information used by the information processing apparatus is based on time data acquired from an external time information generator at a location remote from the information processing apparatus.

In another aspect, the present invention provides a method of operating an image forming apparatus having at least one of a copy mode in which job data supplied from a scanner unit is printed by a printer unit, a print mode in which job data supplied from an external device is printed by the printer unit, a box mode in which job data supplied from the scanner unit or job data supplied from an external device is stored in a storage unit, and the stored job data is output to the printer unit or an external device in response to a command issued by a user, and a transmission mode in which job data supplied from the scanner unit is transmitted to an external device, the image forming apparatus being capable of using time data generated by an external time information generator, the method comprising a setting step in which a processing condition associated with job data to be processed by the image forming apparatus is set, and a process restriction control step in which the processing is controlled such that execution of processing is enabled when the image forming apparatus is currently in a status in which the time information used by the image forming apparatus is based on time data acquired from the external time information generator, but execution of the same processing is disabled when the image forming apparatus is currently in any status different from the former status.

In another aspect, the present invention provides an information processing apparatus having a plurality of operation modes and capable of using time information, comprising a display control unit adapted to display, on a display, status information indicating the status of the information processing apparatus, and a notification unit for displaying notification information on the display to notify a user whether time information used by the information processing apparatus is based on time data acquired from an external time information generator at a location remote from the information processing apparatus.

In another aspect, the present invention provides an image forming apparatus having at least one of a copy mode in which job data supplied from a scanner unit is printed by a printer unit, a print mode in which job data supplied from an external device is printed by the printer unit, a box mode in which job data supplied from the scanner unit or job data supplied from an external device is stored in a storage unit, and the stored job data is output to the printer unit or an external device in response to a command issued by a user, a transmission mode in which job data supplied from the scanner unit is transmitted to an external device, the image forming apparatus being capable of using time data generated by an external time information generator, the image forming apparatus comprising a setting unit adapted to set a processing condition associated with job data to be processed by the image forming apparatus, and a process restriction control unit adapted to control the processing such that execution of processing is enabled when the image forming apparatus is currently in a status in which the time information used by the image forming apparatus is based on time data acquired from the external time information generator, but execution of the same processing is disabled when the image forming apparatus is currently in any status different from the former status.

In another aspect, the present invention provides a program for implementing a display control method.

In another aspect, the present invention provides a program for implementing a method of operating a device.

BRIEF DESCRIPTION OF THE DRAWINGS

FIG. 13 is a diagram showing table data according to an embodiment of the present invention.

FIG. 14 is a diagram showing a system according to an embodiment of the present invention.

FIG. 19 shows an enabled/disabled operation table according to another embodiment of the present invention.

FIG. 21 is a diagram showing a memory map of a storage medium in which various data processing programs are stored, according to the present invention.

DESCRIPTION OF THE PREFERRED EMBODIMENTS

The present invention is described in further detail below with reference to preferred embodiments of electronic devices (also referred to as information processing apparatus, image forming apparatus, and simply as a device) having a capability of setting time using time information provision service. In the embodiments described below, by way of example, the invention is applied to a device for performing Internet facsimile communication.

In the present embodiment, it is presumed that the time information provision service is provided via the Internet. In the time information provision service via the Internet, it is possible to make adjustment in terms of all parameters associated with year, month, date, and time. Thus, the time information provision service provided via the Internet is suitable for use in embodiments according to the present invention.

Figure 1:
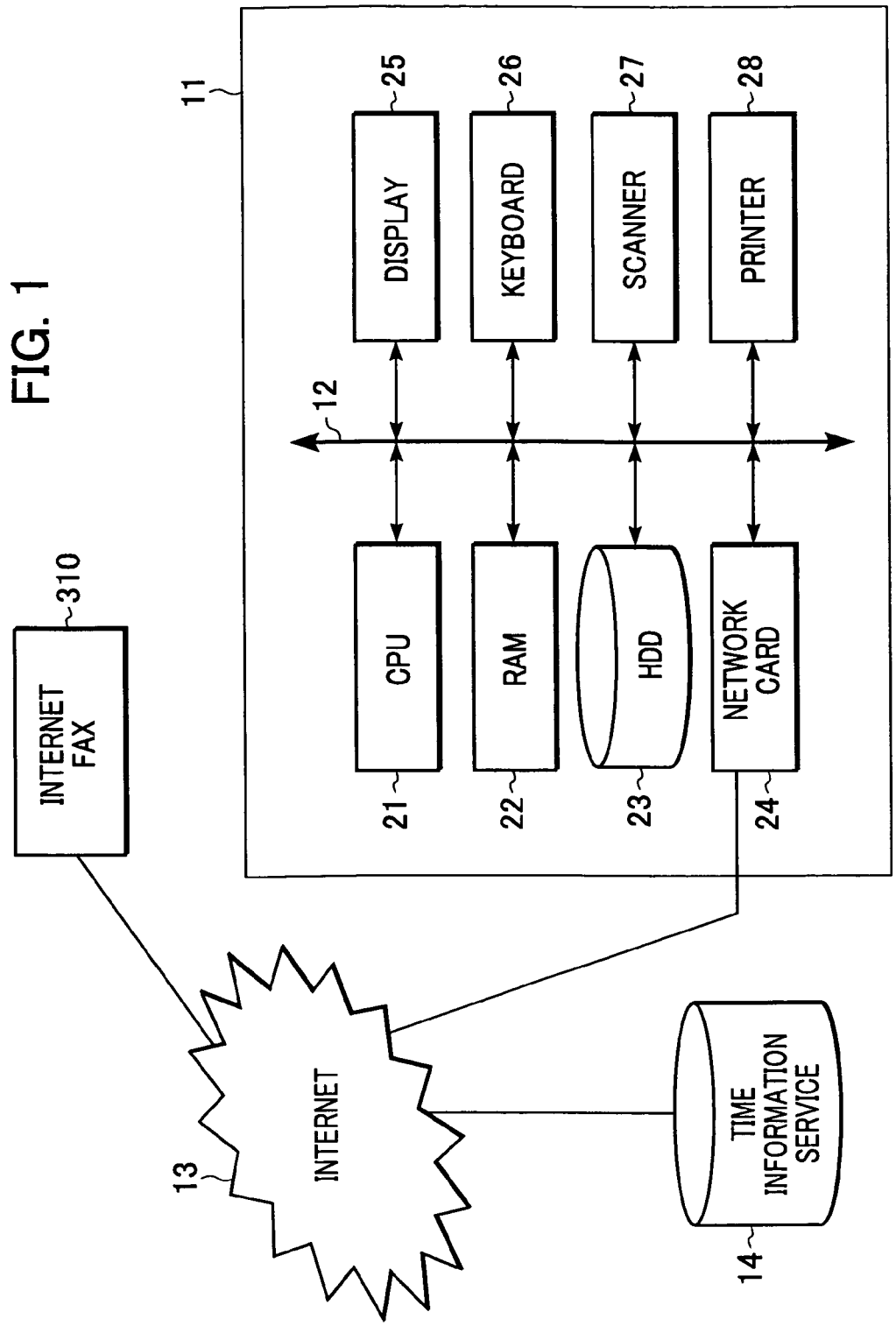
FIG. 1 is a block diagram showing a construction of an Internet facsimile machine that is an example of an electronic device according to an embodiment of the present invention.

FIG. 1 is a block diagram showing a construction of an Internet facsimile machine that is an example of an electronic device according to an embodiment of the present invention.

As shown in FIG. 1, the Internet facsimile 11 according to the present embodiment includes a CPU 21, a RAM 22, a hard disk drive (HDD) 23, a network card 24, a display 25, a keyboard 26, a scanner 27 for scanning a document, and a printer unit 28 for performing printing, wherein those parts are connected with each other via a CPU bus 12.

The CPU 21 measures time by counting a clock generated by an internal oscillator. Time information is stored in the RAM 22 and displayed on the display 25 as required.

In the present embodiment, the Internet facsimile 11 is connected to the Internet 13 via the network card 24. Another Internet facsimile 310, configured in a similar manner to the Internet facsimile 11 and having similar capabilities to those of the Internet facsimile 11, is also connected to the Internet 13. In the present embodiment, by way of example, the Internet facsimile 11 communicates with the Internet facsimile 310. The details of communication operation between those two Internet facsimiles will be described later.

The Internet facsimile 11 has a capability of accessing the time information service server 14 such as "time.nist.gov" or "time.windows.com"® for achieving time synchronization.

The time information service server 14 has an accurate internal clock and provides date/time information to the Internet facsimile 11 via the Internet. Each time the Internet facsimile 11 receives data/time information, the Internet facsimile 11 makes a correction in terms of a delay that occurs in communication via the Internet thereby acquiring corrected data/time information with a small residual error that is less than one second. The principles of such a time information service server are well known, and thus a further detailed description thereof is not given herein.

The present invention may also be applied to time setting service using a radio wave or a telephone line. However, in the case in which only the time information is adjusted using time information provision service, the date (year, month and day) cannot be corrected when the date is incorrectly set. The device can be used even in such a situation, if a setting that cannot be guaranteed as being correct, such as the date (year, month and day), is regarded as being correct. In the present embodiment, there is no specific restriction on the details of the time information provision service.

As described above, the present embodiment of the invention can be applied to a device or a system that has the capability of allowing the date/time information to be manually set by a user via the operation control unit and that has the capability of performing data communication with an external device that generates time information and automatically or manually setting the date/time information used by the device on the basis of the information supplied by the external device serving as the time information generator.

In the present description, when time information manually set by a user of the device via an operation control unit or the like is used as first-type time data, time information acquired from an external time information generator is used as second-type time information. Conversely, when time information acquired from the external time information generator is used as first-type time information, time information manually set by a user of the device via the operation control unit or the like is used as second-type time data. In any either case, the present embodiment of the invention is applicable.

In the present embodiment, time information includes a plurality of time information elements such as year data indicating a year in AD, date data indicating a month and a day, and time data in units of hours, minutes, and seconds. However, in the present embodiment, the time information is not limited to the above form, but may include another element (e.g., an element indicating what day of the week), or the time information may include only some of the above described elements (e.g., the time information may include only year data, date data, and hour data).

Some of the above described elements, such as year and date data, may be based on time information managed by the device. Other elements, such as hour data, may be based on information acquired from the external time information generator.

In the present embodiment, the device is configured in the above-described manner, and the device is capable of performing processing on the basis of time information (first-type time data) set via the operation control unit of the device, and also capable of performing processing on the basis of time information (second-type time data) acquired from the external time information generator. Even when the time information is not set either on the first-type time data or the second-type time data, that is, in a state in which the time data is unset, some capabilities or functions of the device can still be used.

In the present embodiment, the device or system can operate in accordance with time data manually set and can also operate in accordance with time data automatically set. Furthermore, the device can operate even in a status in which time information is not set either manually or automatically. In the device, status information indicating whether the time information has been set on the basis of the first-type time data or on the basis of the second-type time data, or whether the time information has not been set by either is stored in memory. In accordance with the status information stored in the memory, the contents of the operation control screen of the operation control unit serving as the user interface are dynamically switched, and the capabilities or processes associated with a particular status are enabled or disabled.

Figure 2:
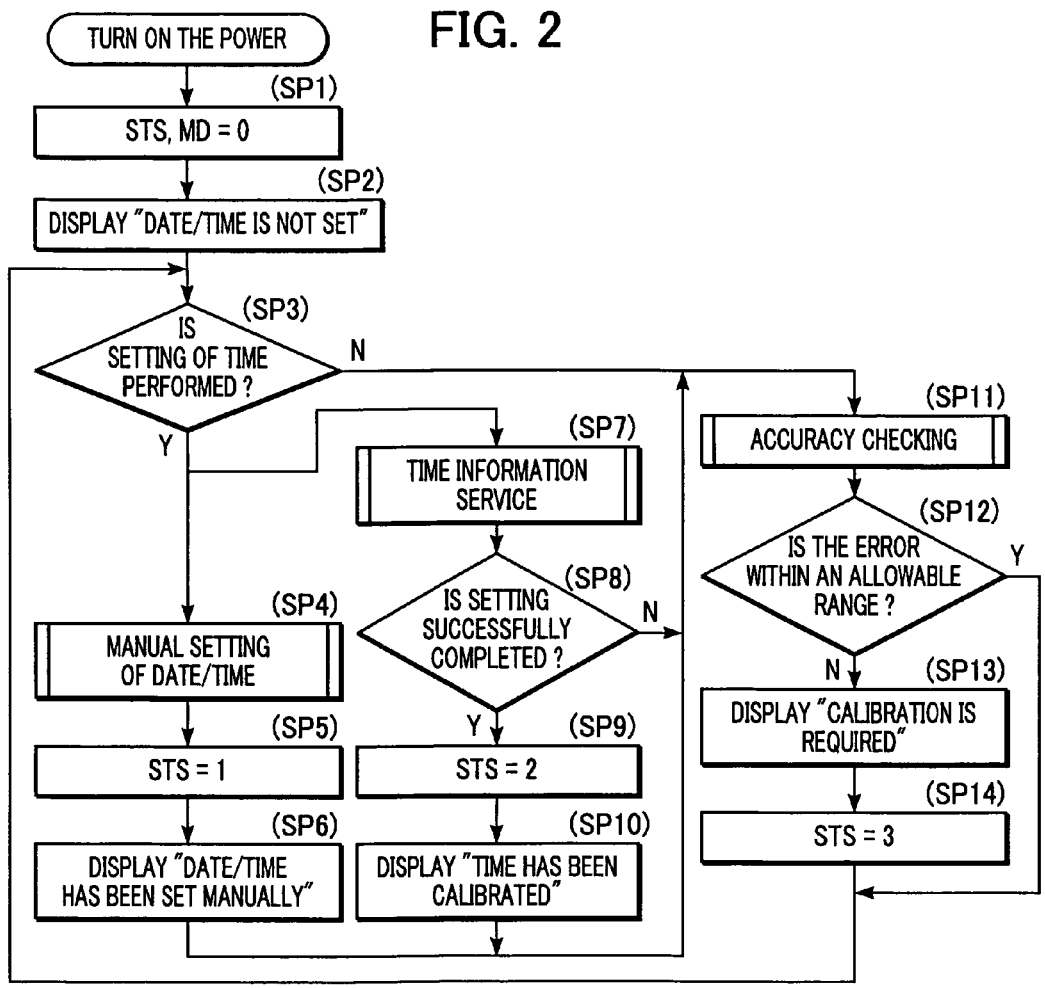
FIG. 2 is a flow chart showing a first data processing procedure according to the present invention.

FIG. 2 is a flow chart showing a first data processing procedure performed by the electronic device according to the present invention, wherein the first data processing procedure corresponds to the operation performed by the Internet facsimile machine 11 to set the date/time information. In FIG. 2, SP1 to SP14 denote step numbers.

The processes shown in flow charts in the present embodiment, such as the process shown in the flow chart in FIG. 2, are performed by the CPU 12 of the electronic device by executing programs read from a memory. Note that the present embodiment of the invention is applicable regardless of which unit of which device operates as the controller that executes the programs to perform the processes.

In step SP1, after the power of the Internet facsimile 11 is turned on, the CPU 21 initializes internal parameters STS and MD stored in the RAM 22 to 0.

The parameter STS indicates the status of setting the date/time. When STS=0, the date and the time are not set at all, such as in a situation where the power of the Internet facsimile 11 is turned on for the first time. STS=1 indicates that the date/time information has been set manually. STS =2 indicates that the date/time has been successfully set by accessing the time information service server 14.

STS=3 indicates that calibration of the date/time information, which is expected to have been performed on the basis of information acquired from the time information service server 14, has not been performed for a period longer than a predetermined length of period.

In the present embodiment, as described above, the status of the present electronic device in terms of the date/time information is indicated by the value of the parameter STS, and the CPU 21 performs management associated with the date/time information on the basis of the value of the parameter STS, as described below.

In a case where a detection signal from an operation control unit of the present electronic device indicates that time information (the first-type time information) is not set by a user via the operation control unit, or a detection signal from a particular unit such as the network card 24 indicates that the time information (the second-type time information) has not been acquired from an external time information generator, the CPU 21 determines that the date/time information has been not been manually or automatically set or calibrated. Upon this determination, the CPU 21 sets the parameter STS stored in the memory to zero.

In a case in which the detection signal from the operation control unit of the electronic device indicates that the time data (the first-type time data) has been set by a user using the operation control unit, the CPU 21 determines that the date/time information of the electronic device has been manually set (that is, the date/time information is in a manually set state), and the CPU 21 rewrites data stored in the memory such that STS=1.

In a case in which the detection signal from the particular unit such as the network card 24 indicates that the time data (the second-type time data) has been automatically acquired from the external time information generator, with which the electronic device is capable of communicating, and that the time information of the electronic device has been automatically calibrated on the basis of the acquired time information, the CPU 21 determines that the date/time information has been automatically set (that is, the date/time information is in a calibrated state), and the CPU 21 rewrites data in the memory such that STS=2.

In a case in which, from a network communication error signal supplied from the particular unit such as the network card 24, the CPU 21 determines that the time data (the second-type time data) cannot be successfully acquired from the external time information generator, with which the present electronic device is capable of communicating, and thus calibration is not possible, the CPU 21 determines that a calibration error of the date/time information has occurred (that is, the date/time information is in a state in which calibration is needed), and the CPU 21 rewrites the data in the memory such that STS=3.

Depending on the status information (i.e., the value of the parameter STS) associated with the date/time used by the electronic device, the CPU 21 determines the contents displayed on an operation control screen as described below, determines whether to restrict the capabilities, and determines what capabilities should be restricted if restriction should be imposed.

The parameter MD indicates a restriction imposed on the operation of the Internet facsimile machine depending on the value of the parameter STS.

The device according to the present embodiment has a plurality of capabilities and operation modes, such as a mode in which job data input via a scanner unit is transferred to another apparatus, and a mode in which job data received from another apparatus is printed using a printer unit. In the device having such capabilities and operation modes according to the present embodiment, some modes need highly accurate time information, some modes do not need very highly accurate time information, although they need a certain degree of accuracy, and some modes can work without requiring any time information at all.

In the present embodiment, in view of the above, depending on the value of the parameter STS, the parameter MD is set to a particular value to restrict the capabilities or operation(s) of the device.

When MD=0, the plurality of operation modes, also referred to as capabilities, of the present apparatus are all enabled regardless of the value of the parameter STS (that is, regardless of the status of the apparatus in terms of time data).

In this restriction state, (that is when MD=0, regardless of the value of STS, the CPU 21 permits a user to select any one of the plurality of operation modes and permits operation in the selected operation mode to be performed. This includes a received data print mode in which received job data is printed and a data transmission mode in which input job data is transmitted to the outside.

When MD=1, reception of data is enabled even if STS≠2 (that is, if STS=0, 1, or 3), although the other operation modes are disabled. In other words, regardless of whether the parameter STS has any one of values 0, 1, 2, or 3, reception of data is enabled (the other operation modes are disabled) However, only when STS=2, is there another enabled operation mode. For example, transmission of data to another apparatus is enabled in addition to reception of data.

In this state in terms of restriction (MD=1), the CPU 21 enables printing of job data received from an external device (the received data print mode) but disables any operation mode (for example, data transmission mode) other than the received data print mode, regardless of which one of the following three statuses in terms of time data the present apparatus is in: a status in which an operation on the basis of time data (first-type time data) manually set using the operation control unit is possible (STS=1); a status in which time data has not been set either manually or automatically (STS=0); or a status in which calibration on the basis of time data supplied from the outside is impossible (STS=3). Furthermore, in this state in terms of restriction (MD=1), if the current status of the present apparatus allows an operation on the basis of time data (second-type time data) supplied from the external device (that is, if STS=2), the CPU 21 enables, in addition to the received data print mode, other operation modes (for example, transmission mode) that are disabled in the other statuses in terms of time data (STS=0, 1, or 3).

When MD=2, even if STS≠2, transmission of data is permitted, although any other operation mode is disabled. In other words, regardless of which one of values 0, 1, 2, or 3 the parameter STS has, the data transmission mode is enabled and the other operation modes are disabled. However, when STS=2, not only is the data transmission mode enabled, but the other operation modes such as the received data print mode, are also enabled.

In this state in terms of restriction (MD=2), regardless of the status in terms of time data, that is, regardless of whether operations on the basis of time data (first-type time data) manually set using the operation control unit are enabled (STS=1), or time data is not set either manually or automatically (STS=0), or calibration on the basis of time data supplied from the external is impossible (STS=3), the CPU 21 enables the transmission mode but disables the other operation modes (such as the received data print mode). Furthermore, in this state in terms of restriction (MD=2), when the current status of the apparatus in terms of time data allows operations on the basis of time data (second-type time data) supplied from the outside (that is, when STS=2), the CPU 21 enables not only the transmission mode but also the other operation modes (for example, the received data print mode) that are disabled in the other statuses in terms of time data (STS=0, 1, or 3).

The decision rule the CPU 21 relies on to determine how to control the operation or capabilities of the device depending on the status or conditions, may be described in the form of a table such as that shown in FIG. 13. The table may be stored in a memory (not shown) so that the CPU 21 can control the operation or the capabilities of the device in accordance with the rule described in the table stored in the memory. The value of the parameter MD may be set by a user using the operation control unit of the present apparatus, or may be automatically set by the CPU 21 depending on the value of the parameter STS managed by the CPU 21. The CPU 21 determines what restriction(s) to impose or what operation to enable or disable, in accordance with management information described in the management table 1300 shown in FIG. 13, depending on the value of the parameter MD and the value of the parameter STS stored in the memory. What operation is restricted and in what manner may be changed by a user as required. That is, the contents described in the rightmost column of the table shown in FIG. 13 may be changed. When a new capability is added to the present apparatus, the rule and the condition associated with the new capability may be determined and the management data described in the management table 1300 may be modified so as to reflect the rule and the condition associated with the new capability.

The manner of controlling the operation of the present apparatus is not limited to that described above. For example, in data transmission, the CPU 21 may enable scanning of a document but enable actual transmission only when STS=2. The CPU 21 may control data reception in such a manner that the CPU 21 tentatively stores received data together with data indicating date/time in the HDD 23, and the CPU 21 rewrites the tentative date/time with the correct date/time calculated on the basis of the date/time calibrated when STS=2 thereby making it enabled to print the received data. That is, details of the manner of controlling the operation may be modified as required.

The above modification make it possible to use the device when the date/time is not correctly set, thus improving the availability of the device.

FIGS. 3 to 6 show specific examples of the display 25 and the operation key unit 26, shown in FIG. 1, of the apparatus according to the present embodiment of the invention.

FIGS. 3 to 6 show, in the form of plan views, an example of the operation control panel including the display 25 and the operation key unit 26 shown in FIG. 1, wherein similar parts to those in FIG. 1 are denoted by similar reference numerals.

In the example shown in FIGS. 3 to 6, some keys are provided in the form of soft keys on the screen of the display 25 of the operation control panel, and the other keys are provided in the form of mechanical hard keys (keys 31 to 38). Note that all keys may be provided in the form of soft keys on the operation screen, or some keys (for example, keys 31 to 33) of the hard keys shown in FIG. 3 may be provided in the form of soft keys on the display screen. That is, in the present embodiment, there is no particular restriction on the details of the operation control panel.

The operation of the display 25 shown in FIGS. 3 to 6 is controlled by the CPU 21. More specifically, in accordance with the flow shown in FIG. 1 and on the basis of the values of STS, MD, and other parameters stored in the memory, the CPU 21 determines what to display on the display 25 and controls the display 25 so as to display the operation control screen including what has been determined above. The keys described below may be provided in the form of hark keys or soft keys displayed on the operation control screen.

Figure 3:
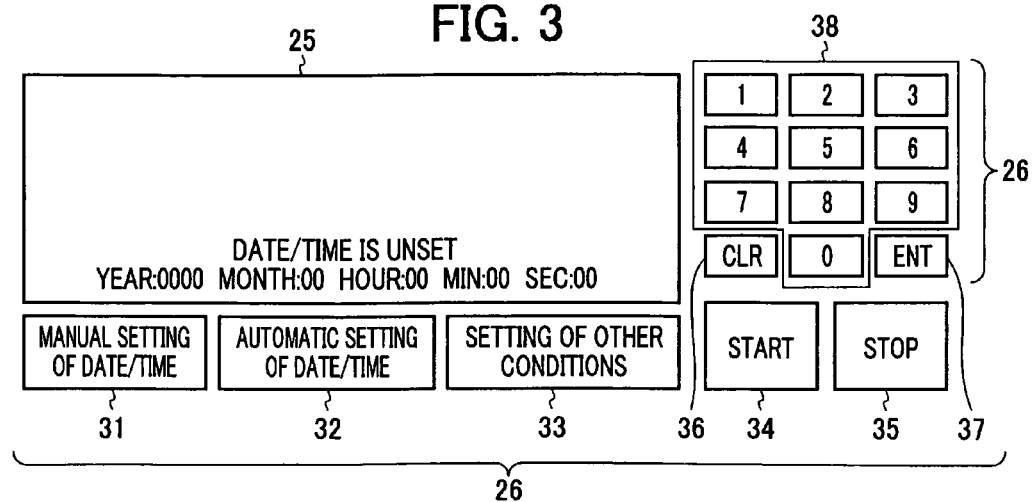
FIG. 3 is a plan view showing an example of an operation control panel including a display shown in FIG. 1 and an operation key unit.

FIG. 3 shows the display 25 and the operation key unit 26 in a state in which the power is just turned on.

In FIGS. 3 to 6, the display 25 is formed of, for example, a liquid crystal display panel, and the status in terms of setting of date/time and also date/time information itself are displayed in a bottom area of the display 25.

In the state shown in FIG. 3, the present apparatus is in a status in which the time information is not set either by a user (that is, first-type time information is not given) or automatically on the basis of time information (second-type time information) supplied from the external time information generator (that is, STS=0). In this status, the CPU 21 displays the operation control screen including the contents such as those shown in FIG. 3 on the display 25.

In the operation key unit 26, a date/time manual setting key 31 is used to manually set date/time. If the key 31 is pressed by a user, the CPU 21 displays, on the display 25, a screen (not shown) for use by the user in manually setting date/time information (first-type time data). Via this screen, the user can manually set date/time information (year, month, day, hour, min, and sec) by using numerical keys 38, a clear key 36 for clearing input data, and an enter key 37 for finally entering the input data, although further details of manner of inputting data are not described.

Figure 4:
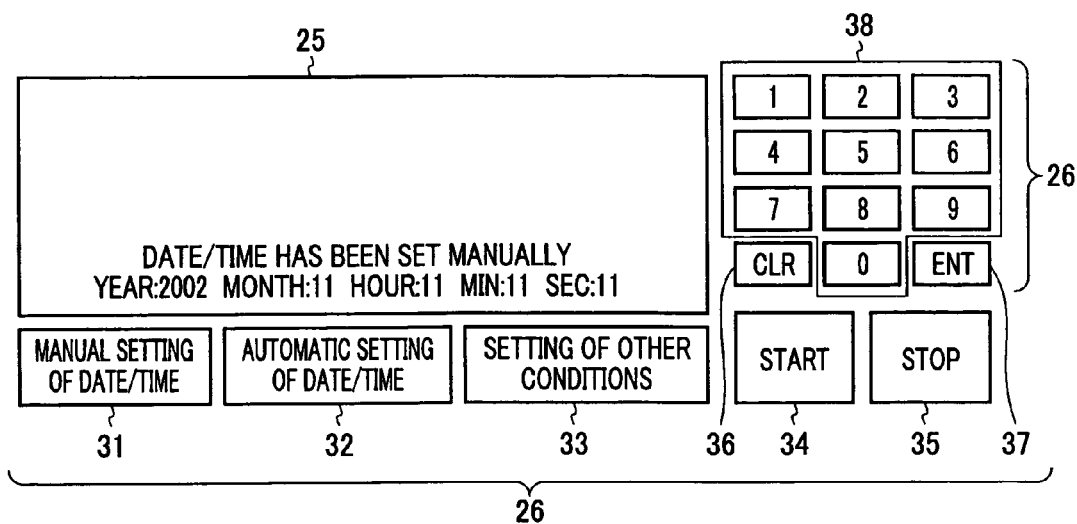
FIG. 4 is a plan view showing the operation control panel in another status.

If the date/time information is manually set by the user via the screen for use in manually setting date/time information (first-type time data) in step SP4 in the flow chart of in FIG. 2, the CPU 21 changes the value of the parameter STS to 1 in step SP5 of FIG. 2 and stores the manually set date/time data in the memory. On the basis of the stored date/time data, the CPU 21 measures passage of time and displays, on the display 25, date/time on the basis of the measurement result as shown in FIG. 4. More specifically, the CPU 21 displays on the display 25 the operation control screen on which a message indicating that the date/time information has been set and the setting of the date/time information has been performed manually is displayed along with other data (step SP6 of FIG. 2). Thus, the user can recognize via the operation control unit that the date/time information has been set and the setting of the date/time information has been performed manually by the user.

A automatic date/time setting key 32 is used to set the date/time either by immediately accessing the time information service server 14 or to specify intervals at which to automatically set the date/time by accessing the time information service server 14. The setting of the intervals can be performed using the clear key 36, the enter key 37, and the numeric keys 38.

Figure 5:
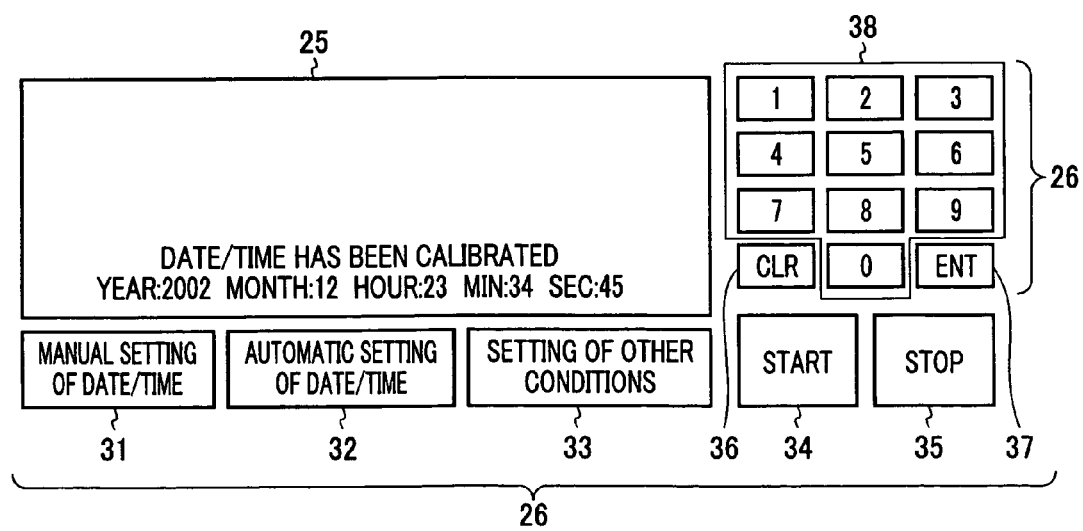
FIG. 5 is a plan view showing the operation control panel in still another status.

If a command to automatically set the date/time information is issued by a user by selecting the above-described automatic date/time setting key 32, the CPU 21 enters a time information usage mode. While in this mode, the CPU 21 acquires date/time information from the external time information generator, such as the time information service server 14 with which the present apparatus is capable of communicating, measures passage of time with respect to the acquired date/time information (second-type date/time data), and displays date/time information in accordance with the measurement result on the display 25 as shown in FIG. 5. More specifically, the CPU 21 displays, on the display 25, the operation control screen on which a message indicating that the date/time information has been set, the setting of the date/time information has been performed automatically on the basis of date/time information acquired from the external time information generator, and calibration of the date/time information has been performed is displayed along with other data. In addition to the process described above, the CPU 21 changes the value of the parameter STS to 2 (steps SP7 to SP10 in FIG. 2). From the contents displayed on the operation control screen, the user can recognize that the date/time information has been set, setting of the date/time information has been performed on the basis of date/time information acquired from the external time information generator, and calibration of the date/time information has been performed.

As described above, when the key 32 is selected, the CPU 21 performs the following: the operation mode is switched into the automatic setting mode in which date/time information is acquired from the external time information generator, setting of the date/time information acquired from the external time information generator is performed, and the date/time information of the present apparatus is calibrated on the basis of the date/time information acquired from the external time information generator. The acquisition, the setting, and the calibration may be performed immediately (in real time) after the key 32 is pressed by the user, may be automatically performed when a specified period of time (for example, one hour) has passed since the pressing of the key 32 by the user, or may be automatically performed periodically at specified intervals (for example, every 4 hours) after the key 32 is pressed by the user. As described above, the timing of automatically setting the time information may be determined depending on the environment in which the present apparatus is used. That is, in the present embodiment of the invention, there is no particular restriction on the details of how to acquire the time information from the external time information generator and how to use, manage, and control the acquired time information.

A key 33 is used to perform various settings of other conditions. If this key 33 is selected, the CPU 21 displays, on the display 25, a detail setting screen (not shown) that includes various setting keys such as a MD value setting key for displaying a MD value setting screen (not shown) for use by a user in setting or changing the value of the MD parameter, and an upper limit setting key for displaying an upper limit setting screen for use by the user in setting the upper limit of the interval of time within which the time information service server 14 is not allowed to be used after a previous usage of the time information service server 14.

For example, if the user selects the MD value setting key (not shown) in the detail setting screen (not shown), the CPU 21 switches the screen displayed on the display 25 to the MD value setting screen (not shown) thereby making it possible for the user to set or change the value of the MD parameter. The value of the MD set via this screen is stored as registration information in the memory for future use in controlling the operation of the present apparatus (steps SP21 and SP22 in FIG. 7).

In setting of the upper limit, as in setting of other parameters, the clear key 36, the enter key 37, and the numeric keys 38 can be used. Although in the present embodiment, the upper limit is set by a user to an arbitrary value, the upper limit may be set to a predetermined fixed value depending on the accuracy of the timer and the allowable error of time.

On the other hand, if the user presses the upper limit setting key (not shown) in the detail setting screen (not shown), the CPU 21 switches the screen displayed on the display 25 to the upper limit setting screen (not shown).

Via this upper limit setting screen, the user can set the interval of time at which, in the automatic setting mode, time information is acquired from the external time information generator such as the server 14 and setting and calibration of time information are performed. For example, if the user sets the interval of time to 4 hours via this screen, data indicating the specified interval is stored as management information, and the CPU 21 automatically accesses the external server 14 every 4 hours to perform acquisition, setting, and calibration of time information.

Figure 6:
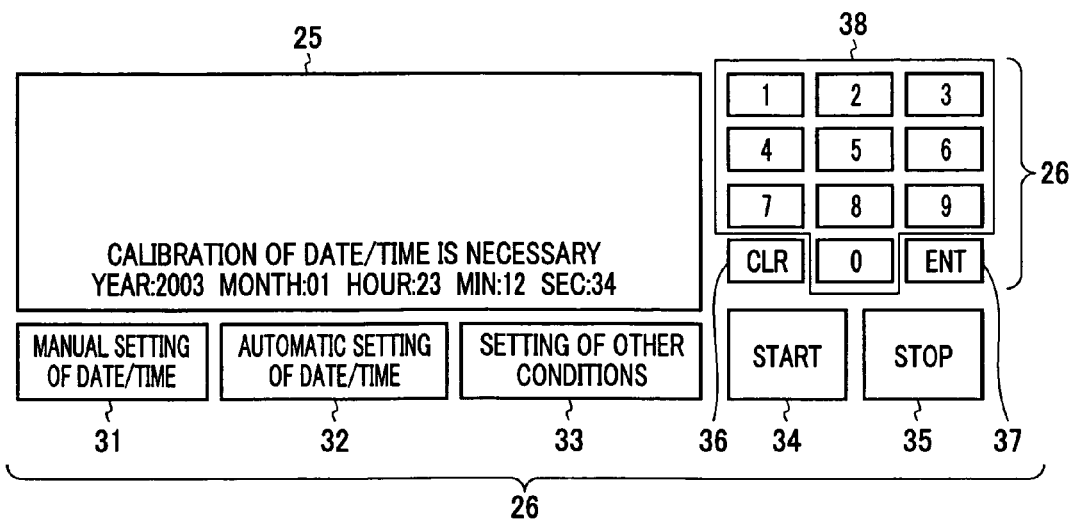
FIG. 6 is a plan view showing the operation control panel in still another status.

Furthermore, in the present embodiment, the CPU 21 measures the non-response period during which no response is received from the external server after transmission of an access request to the external server 14. If the CPU 21 detects that the non-response period has reached a predetermined value, the CPU 21 determines that a calibration error has occurred and the CPU 21 changes the value of the parameter STS to 3. In this case, for example, as shown in FIG. 6, the CPU 21 displays, on the display 25, an operation control screen including a message for informing the user of the present apparatus that calibration of the time information used by the present apparatus. Herein, the calibration refers to adjustment of the time information currently used by the present apparatus to correct time information, and is performed when the current time information has an error with respect to the correct time information (steps SP13 and SP14 in FIG. 2).

The allowable upper limit of the non-response period in which no response is obtained can also be set via the upper limit setting screen.

For example, in the case in which the allowable upper limit of the non-response period is set by the user to 15 minutes, if the CPU 21 detects that no response is obtained from the external server 14 within 15 minutes after accessing the external server 14, the CPU 21 changes the value of the status in terms of setting of date/time information used by the present apparatus such that STS=3, and the CPU 21 informs, via the display 25, the user of that fact as shown in FIG. 6.

From the information displayed on the operation control unit 25, the user can recognize that although the automatic setting mode is available, it is necessary to calibrate the date/time information displayed on the operation control unit 25.

If a start key 34 is selected by the user after completion of various settings (for example, specifying of conditions of image processing on the document, specifying of the destination, etc.) associated with a document to be transmitted, the CPU 21 performs transmission of job data of that document. A stop key 35 is used to stop an operation such as data transmission or data reception.

The apparatus, according to the present embodiment, has a memory such as a hard disk capable of storing a plurality of jobs. It is also possible to store image data for use in reprinting the image in the memory. When reprinting is needed, if the start key 34 is selected after completion of setting the conditions associated with reprinting, reprinting is performed using the data stored in the memory.

The construction of the apparatus according to the present embodiment has been described above. Referring back to the flow chart shown in FIG. 2, in step SP2, the device is in a situation in which the power of the present apparatus is turned on for the first time. Parameter STS=0, and thus the CPU 21 displays, on the display 25, a message indicating that the date/time is unset, for example, as shown in FIG. 3. Although in the example shown in FIG. 3, a text message is displayed to inform the user that the date/time is unset, another method of informing the user that the date/time is unset would be to cause the numerals of the date/time information (numerals are all 0 in this case) to blink on the display 25.

Alternatively, if the display 25 has the capability of displaying colors, the date/time information itself or the field of the date/time information may be displayed in red to alert of the warning.

In the present embodiment, as described above, when the present apparatus is in a status in which the date/time information has not been set either manually or automatically, and the apparatus is in operation with the date/time information unset, the CPU 21 informs the user of this fact.

Although in the present embodiment, the display 25 is used as the notification unit, the notification unit is not limited to the display 25. For example, a voice unit that outputs an audible message such as voice notification, or an alarm lamp may be used to inform the user that the date/time information is unset.

In step SP3, it is determined whether the date/time manual setting key 31 on the operation key unit 26 is selected, or the date/time automatic setting key 32 is selected, or performance of an operation, programmed to be performed at scheduled intervals, to set the date/time information by accessing the time information service server 14 is required to be performed. If it is determined in step SP3 that any setting operation associated with time is not necessary, the process proceeds to step SP 11.

In the present embodiment, calibration of the date/time information using the time information service server 14 (adjustment of the date/time information to the correct date/time value) is performed by automatically accessing the date/time information service at scheduled intervals of time (specified by a user via the setting screen displayed on the display 25 in response to selecting the key 33) or by accessing the date/time information service in response to selecting the specific key on the operation key unit 26. In the present embodiment, as described above, the operation of acquiring time data from the time information service server and making a time adjustment on the basis of the acquired time data may be specified to be performed in real time in response to selecting a key on the operation control screen or may be specified to be performed periodically at predetermined intervals. In any case, the operation is performed under the control of the CPU 21.

If it is determined in step SP3 that the date/time manual setting key 31 on the operation key unit 26 is selected, then in step SP4, a program is executed to allow the user to set the date/time information using the numeric keys 38 in the above-described manner.

After completion of inputting the date/time information, the process proceeds to step SP5. In step SP5, the CPU 21 changes the value of the parameter STS stored in the memory such that STS=1.

Next, in step SP6, a message indicating that the date/time information has been manually set is displayed on the display 25, as shown in FIG. 4.

Alternatively, if the display 25 has the capability of displaying colors, the date/time information itself or the field of the date/time information may be displayed using, for example, red color to inform the user that although the date/time information has been set, the accuracy thereof cannot be guaranteed. After completion of step SP6, the process proceeds to step SP11.

In the present embodiment, as described above, when the present apparatus is in a status in which the date/time information used by the apparatus has been manually set by a user (on the basis of first-type time data), the CPU 21 displays the operation control screen on the display 25 such that a message indicating that the date/time information has been manually set (the date/time information used by the present apparatus has been set, the setting of that date/time information has been performed manually by the user via the operation control unit, and the present apparatus is in operation in the status in which the date/time information has been manually set by the user) is displayed.

If it is determined in step SP3 that the date/time automatic setting key 32 is selected, or if it is determined that the date/time has reached one of scheduled date/time intervals at which to set the date/time information by accessing the time information service server 14, the CPU 21 performs the date/time information service process in step SP7.

More specifically, the date/time is set using the time information service server 14. Thereafter, the process proceeds to step SP8. In step SP8, it is determined whether the date/time setting in step SP7 is successfully completed. If it is determined that step SP7 is successfully completed, the process proceeds to step SP9, but the process jumps to step SP11 if an error is detected.

The error detected in step SP8 can occur, for example, when service from the time information service server 14 is suspended, when accessing the Internet 13 is impossible for some reason, or when accessing the time information service server 14 is impossible because of a failure of the network card 24.

In the case in which an error is detected, a message is displayed on the display 25 to inform the user that an error has occurred. If a cause for the error is detected, information indicating the cause may also be displayed.

If it is determined in step SP8 that the date/time has been successfully set using the time information service server 14, then, in step SP9, the parameter STS is set such that STS=2. Next, in step SP10, a message indicating that the date/time has been calibrated is displayed on the display 25, as shown in FIG. 5. Alternatively, if the display 25 has the capability of displaying colors, the date/time information itself or the field of the date/time information may be displayed using, for example, green color thereby informing the user that the date/time information has been set and the accuracy thereof can be guaranteed.

In the present embodiment, as described above, when the present apparatus is in a status in which the date/time information used by the present apparatus is set on the basis of the date/time information acquired from the external time information generator (on the basis of second-type time data), and the present apparatus is in operation on the basis of that date/time information, the CPU 21 displays the operation control screen on the display 25 to inform the user of the above fact (to inform that the date/time information used by the present apparatus has been set, the setting has been performed on the basis of the date/time information acquired from the external time information generator, and the present apparatus is in operation on the basis of that date/time information).

In step SP11, the length of an elapsed time from the previous usage of the time information service server 14 is compared with the predetermined period, during which usage of the time information service server 14 is disabled. In step SP12, it is determined whether the current time is within an allowable range. If it is determined that the current time is within the allowable range, the process proceeds to step SP3, while the process proceeds to step SP13 if it is determined that the current time is not within the allowable range.

In step SP13, a message indicating that calibration is necessary is displayed on the display 25, as shown in FIG. 6. In the next step (SP14), the parameter STS is set to 3. Thereafter, the process returns to step SP3.

In step SP13 described above, if the display 25 has the capability of displaying colors, the date/time information itself or the field of the date/time information may be displayed using, for example, a blue color thereby informing the user that the accuracy of the date/time information cannot be guaranteed.

In the present embodiment, as described above, when the present apparatus is in a status in which, although the apparatus is in the operation mode in which the date/time information used by the apparatus should be adjusted (calibrated) using the date/time information (second-type time data) acquired from the external time information generator, calibration has not been properly performed, the CPU 21 displays the operation control screen on the display 25 to inform the user of the above fact (that is, to inform that although the apparatus is in the operation mode in which the date/time should be calibrated using the date/time information acquired from the external time information generator, the calibration is not properly completed).

Figure 7:
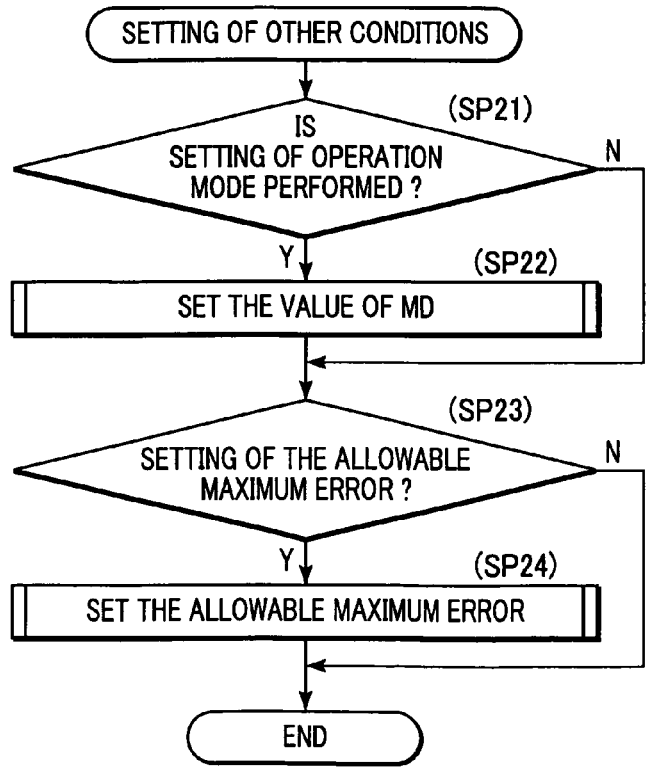
FIG. 7 is a flow chart showing a second data processing procedure according to the present invention.

FIG. 7 is a flow chart showing a second data processing procedure performed by the electronic device according to the present invention, wherein this second data processing procedure is performed in response to selecting the setting key 33 shown in FIG. 3. In FIG. 7, SP21 to SP24 denote step numbers.

If the setting key 33 shown in FIG. 3 is selected, step SP21 is performed first. In this step, it is determined whether the operation mode should be switched into a mode in which the value of the parameter MD is set or changed (for example, it is determined whether a user has pressed the MD value setting key (not shown) on the detail setting screen (not shown) displayed in response to selecting the key 33 on the display 25). If the operation mode should be switched, the process proceeds to step SP22. If the operation mode should not be switch, flow proceeds to step SP23 described below. In step SP22, the MD value setting screen (not shown) is displayed on the display 25 to prompt the user to set or change the value of the parameter MD. In the present embodiment, the value of the parameter MD is allowed to take an integral number within the range of 0 to 2. Thus, in step SP22, the value of the parameter MD is set within the above range. Updating of the value of the parameter MD is performed under the control of the CPU 21. Flow then proceeds to step SP23.

In step SP23, it is determined whether to change the length of period in which the usage of the time information service server 14 is disabled (by judging, for example, whether a user has pressed the upper limit setting key (not shown) on the detail setting screen (not shown) displayed in response to selecting the key 33, on the display 25). If the length of period is not to be changed, the process is ended. If the length of period is to be changed, the process proceeds to step SP24. In step SP24, the upper limit setting screen (not shown) is displayed on the display 25 to prompt the user to change the upper limit. The information indicating the upper limit (the data indicating the length of each interval at which to periodically perform the calibration process including acquisition of date/time information from the outside and adjustment of the date/time on the basis of the acquired date/time information, and the data indicating the upper limit of the non-response period, with respect to which to compare an actual non-response period during which no response is received after issuing an access request to the external server 14 for the purpose of acquiring date/time information thereby determining whether to display an error message on the display 25 to inform the user that calibration is necessary) is stored in the memory, and the process is ended.

Figures 8, 9:
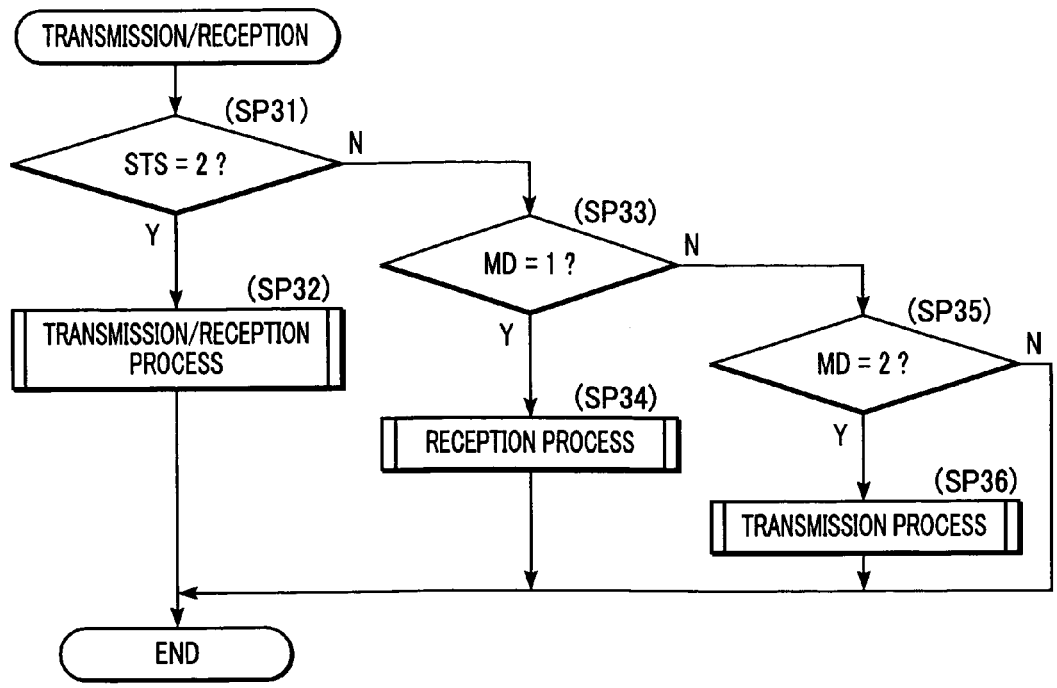
FIG. 8 is a flow chart showing a third data processing procedure according to the present invention.
FIG. 9 is a diagram showing an example of displayed log information associated with transmission/reception performed by the electronic device shown in FIG. 1.

FIG. 8 is a flow chart showing a third data processing procedure performed by the electronic device according to the present invention, wherein this third data processing procedure corresponds to the transmission/reception procedure performed by a Internet facsimile machine, depending on the value of the parameter MD. In FIG. 8, SP31 to SP36 denote step numbers. In this process, the CPU 21 reads the memory, the current values of the parameter STS and the parameter MD, and also reads the management table 1300 shown in FIG. 13 from the memory. The CPU 21 controls the process in accordance with the data read from the memory.

This process is performed in response to selecting the start key 34 shown in FIG. 3 or in response to a request for automatic/manual reception of Internet facsimile data.

First, in step SP31, it is determined whether the value of the parameter STS is equal to 2. If yes, the process proceeds to step SP32. In step SP32, data is transmitted or received. After completion of step SP32, the process is ended.

In the case in which it is determined in step SP31 that the value of the parameter STS is not equal to 2, then, in step SP33, it is further determined whether the value of the parameter MD is equal to 1. If yes, the process proceeds to step SP34. In step SP34, it is determined whether the operation requested to be performed is data reception. If yes, data reception is performed. If the operation requested to be performed is data transmission, the process is ended without performing step SP34.

If it is determined in step SP33 that the value of the parameter MD is not equal to 1, the process proceeds to step SP35. In step SP35, it is determined whether the value of the parameter MD is equal to 2. If yes, the process proceeds to step SP36 to determine whether the operation requested to be performed is data transmission. If the requested operation is data transmission, data transmission is performed. However, if the requested operation is data reception, the process is ended without performing anything.

In the case in which it is determined in step SP35 that the value of the parameter MD is not equal to 2, the process is ended.

In the data transmission and the data reception, an operation log is produced and stored on the HDD 23, although a further detailed description is not given herein. When the operation log is produced, the value of the parameter STS is written together with the date/time.

As described above with reference to the flow chart shown in FIG. 8, the operation is restricted depending on the values of the parameters STS and MD.

FIG. 9 shows an example of log information associated with transmission/reception operations performed by the electronic device shown in FIG. 1. The log information is produced and stored in the memory (not shown) under the control of the CPU 21, and the log information is displayed on the display 25 in response to a request issued by a user.

In FIG. 9, in a column of "Job ID", ID numbers assigned to the transmission/reception operations are described. The ID numbers are assigned in the same order as that in which the transmission/reception operations are performed. A column of "Send/Receive" is used to describe whether the operation is transmission or reception. In a column of "STS", the value of the parameter STS as of the time of transmission/reception is described. A column of "Date & Time" is used to describe the date/time in the form of year.month.day and hour:minutes:seconds.

In the example shown in FIG. 9, the log information indicates that immediately after the power was turned on, transmission was performed when STS=0, and the date/time was set manually before the second transmission operation was performed. Furthermore, the history of the value of the parameter STS indicates that date/time was set using the date/time information service server 14 before Job ID=0004 was processed.

In a job with Job ID=0009, STS=3, which indicates that the period in which the time information service server 14 can not be used has exceeded the allowable upper limit of non-response period that was set between a job with Job ID=0008 and the job with Job ID=0009.

Before the job with Job ID=10, the value of the parameter STS was reset to 2, indicating that the electronic device was recovered into a normal status in which the time information service server 14 can be used.

Because the log information in the example shown in FIG. 9 is a data transmission/reception log, operations associated with setting of the date/time are not described. If necessary, operations of manually or automatically setting or calibrating the date/time may be described in the log, and the log may be displayed or printed.

Although the example depicted in FIG. 9 shows only actually employed values of parameter "STS" and "Date & Time" information, values that the parameter STS and Date & Time information had before the above values were employed may also be recorded in the log.

Such a more detailed description of operation history makes it possible to detect an occurrence of an abnormal operation.

In the present embodiment, as described above, the history of jobs processed by the device is recorded under the control of the CPU 21. In the job history, the processing mode in which each job was processed is described, so as to indicate whether the job was processed in the transmission mode or the received-data print mode. Furthermore, the status in which the job was processed is also described so as to indicate whether STS=0, STS=1, STS=2, or STS=3. The time at which the job was processed is also described. If a log information display command is issued by a user via the operation control unit, the CPU 21 displays the history data in the form such as that shown in FIG. 9 on the display 25.

According to the present embodiment, as described above, in the apparatus using the time information service server 14, the degree of reliability of the date/time information used by the apparatus is represented by the value of the parameter STS. The value is stored, thereby making it possible for the user to know the degree of accuracy of the date/time information used by the apparatus in operations.

Use of the parameter STS also makes it possible to restrict the operation of the apparatus in accordance with a command issued by a user when it is undesirable to use the apparatus in a status in which the date/time information is not accurate enough.

A specific example of the processing flow of exchanging STS information and date/time information is described below with reference to FIGS. 10 to 12.

Figure 10:
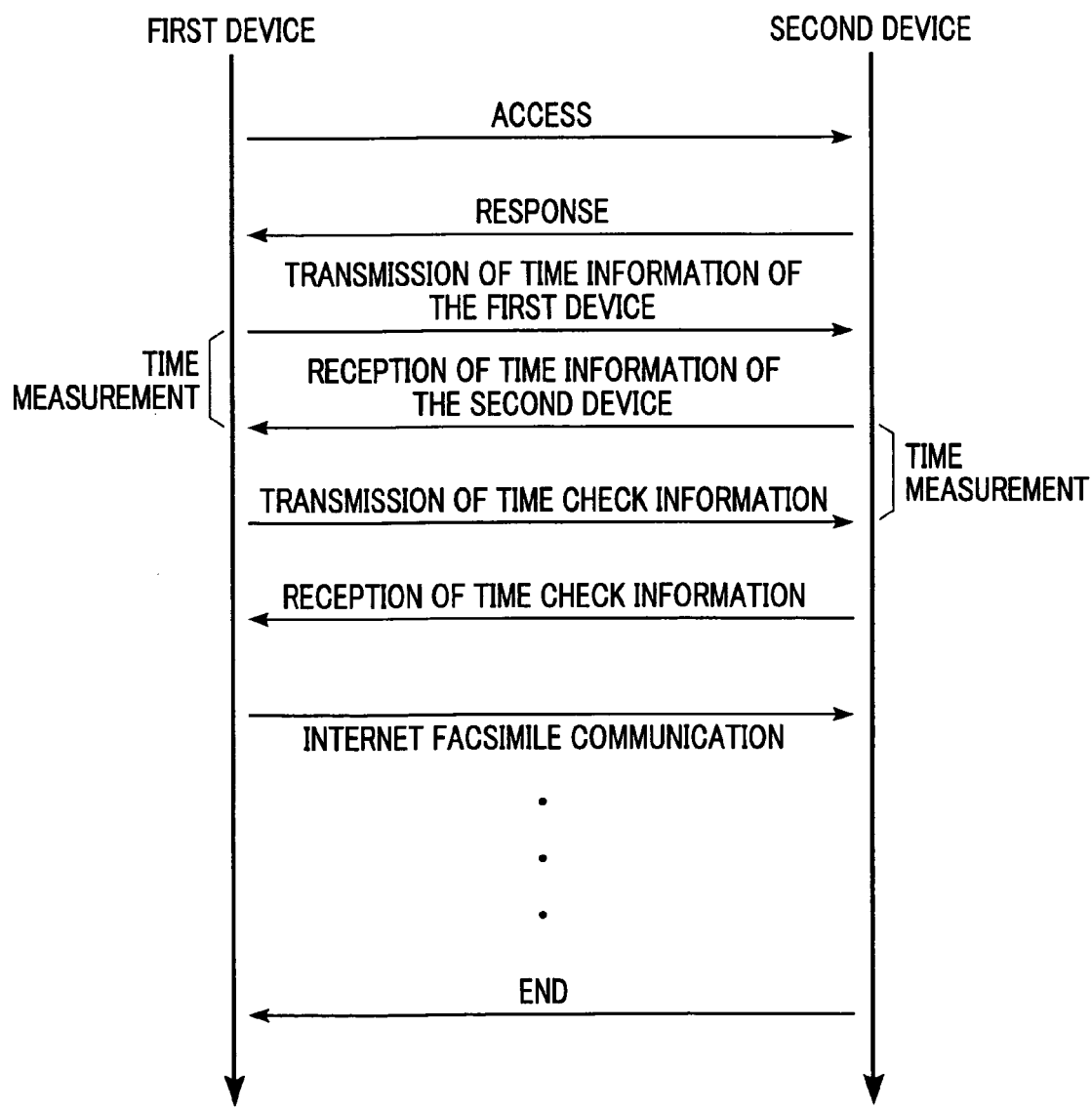
FIG. 10 is a diagram showing a communication cession (communication procedure) between Internet facsimile machines shown in FIG. 1.

FIG. 10 is a diagram showing a communication cession (communication procedure) between the Internet facsimile machine 11 and the Internet facsimile machine 310 shown in FIG. 1.

Figure 11:
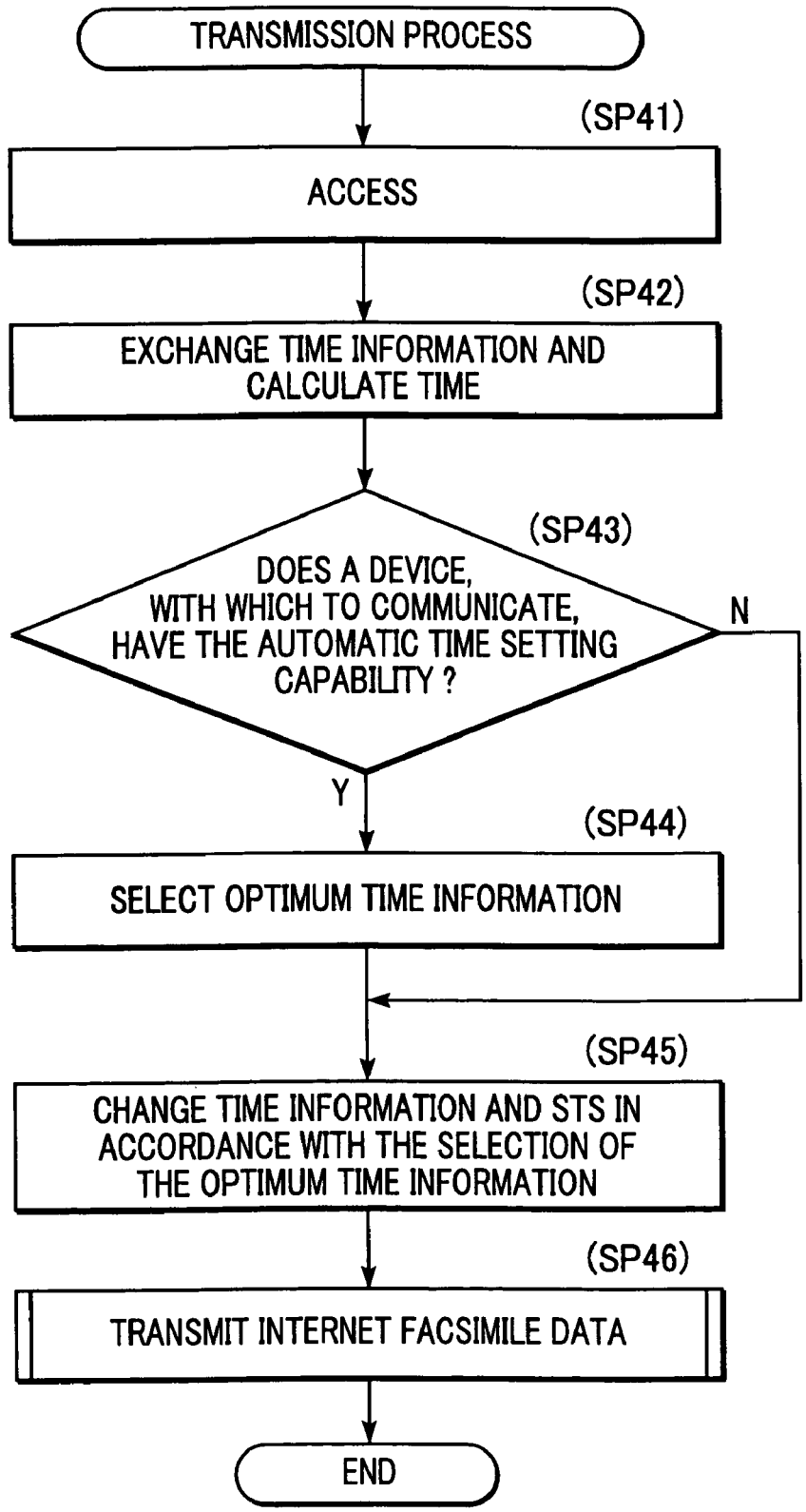
FIG. 11 is a flow chart showing a fourth data processing procedure according to the present invention.

FIG. 11 is a flow chart showing a fourth data processing procedure performed by the electronic device according to the present invention, wherein this fourth data processing procedure corresponds to a transmission process performed in steps SP32 and SP36 shown in FIG. 8. In FIG. 11, SP41 to SP46 denote step numbers.

First, in step SP41, a process corresponding to accessing shown in FIG. 10 is performed. In step SP42, a process corresponding to transmission of time information of the first device and reception of time information of the second device shown in FIG. 10 is performed. As described earlier, to correct the delay time in communication, the time information is exchanged and the correct time is calculated.

In the present embodiment, step SP43 is added to take into account the case where the second device being communicated with does not have the capability to automatically set the date/time.

In step SP43, it is determined whether the second device, with which communication is being performed, has the capability of automatically setting the date/time. If it is determined that the second device does not have the capability, the process proceeds to step SP45. If it is determined that the second device has the capability of automatically setting the date/time information, the process proceeds to step SP44.

In step SP44, the value of the parameter STS of the first device is compared with that of the second device with which the first device is communicating, and the most optimum time information is selected. Specific examples of selection of most optimum time are described below.

EXAMPLE 1

In the case in which STS=0 in the first device (the date/time is not set) and STS=0 in the second device, the value of the parameter STS is equal to 0 in both devices, and thus each device retains its own date/time information.

EXAMPLE 2

In the case in which STS=0 in the first device, and STS≠0 in the second device, the value of the parameter STS of the second device is employed as a common value for both devices, and the date/time information of the second device is employed.

EXAMPLE 3

In the case in which STS=1 in the first device (the date/time has been manually set) and STS=0 in the second device, the value of STS of the first device is employed as a common value for both devices, and the date/time information of the first device is employed.

EXAMPLE 4

In the case in which STS=1 in the first device (the date/time has been manually set) and STS=1 in the second device, the value of the parameter STS is equal to 1 in both devices, and thus each device retains its own date/time information without making a change.

EXAMPLE 5

In the case in which STS=1 in the first device and STS=2 or 3 in the second device, the value of STS of the second device is employed as a common value for both devices, and the date/time information of the second device is employed.

EXAMPLE 6

In the case in which STS=2 in the first device and STS=2 in the second device, the value of the parameter STS is equal to 2 in both devices, and thus each device retains its own date/time information.

EXAMPLE 7

In the case in which STS=2 in the first device and STS≠2 in the second device, the value of 2 is employed as the value of the parameter STS in both devices, and the date/time information of the first device is employed.

EXAMPLE 8

In the case in which STS=3 in the first device and STS=2 in the second device, the value of 2 is employed as the value of the parameter STS in both devices, and the date/time information of the second device is employed.

EXAMPLE 9

In the case in which STS=3 in the first device and STS=3 in the second device, the value of the parameter STS is equal to 3 in both devices, and thus each device retains its own date/time information.

EXAMPLE 10

In the case in which STS=3 in the first device and STS=0 or 1 in the second device, the value of 3 is commonly employed as the value of the parameter STS in both devices, and the date/time information of the first device is employed.

Although in the examples described above, the determination is made on the basis of result of comparison of parameter STS, date/time information may be compared and the determination may be made taking into account the result of comparison of date/time information. More specifically, if a large difference in date/time information is detected, although STS=2, it is determined that an error has occurred. When such an error is detected, not only actually employed value of the parameter STS and date/time information but also the original value of the parameter STS and the date/time information may be recorded for use in analysis/check performed later.

In the case in which selection of optimum date/time information has been performed in step S44, the value of the parameter STS and the date/time information of the first device are changed in step SP45 in accordance with the selection made in step SP44.

In step SP46, facsimile transmission via the Internet is performed using the corrected value of the parameter STS and the corrected date/time information. After completion of step SP46, the process is ended.

Figure 12:
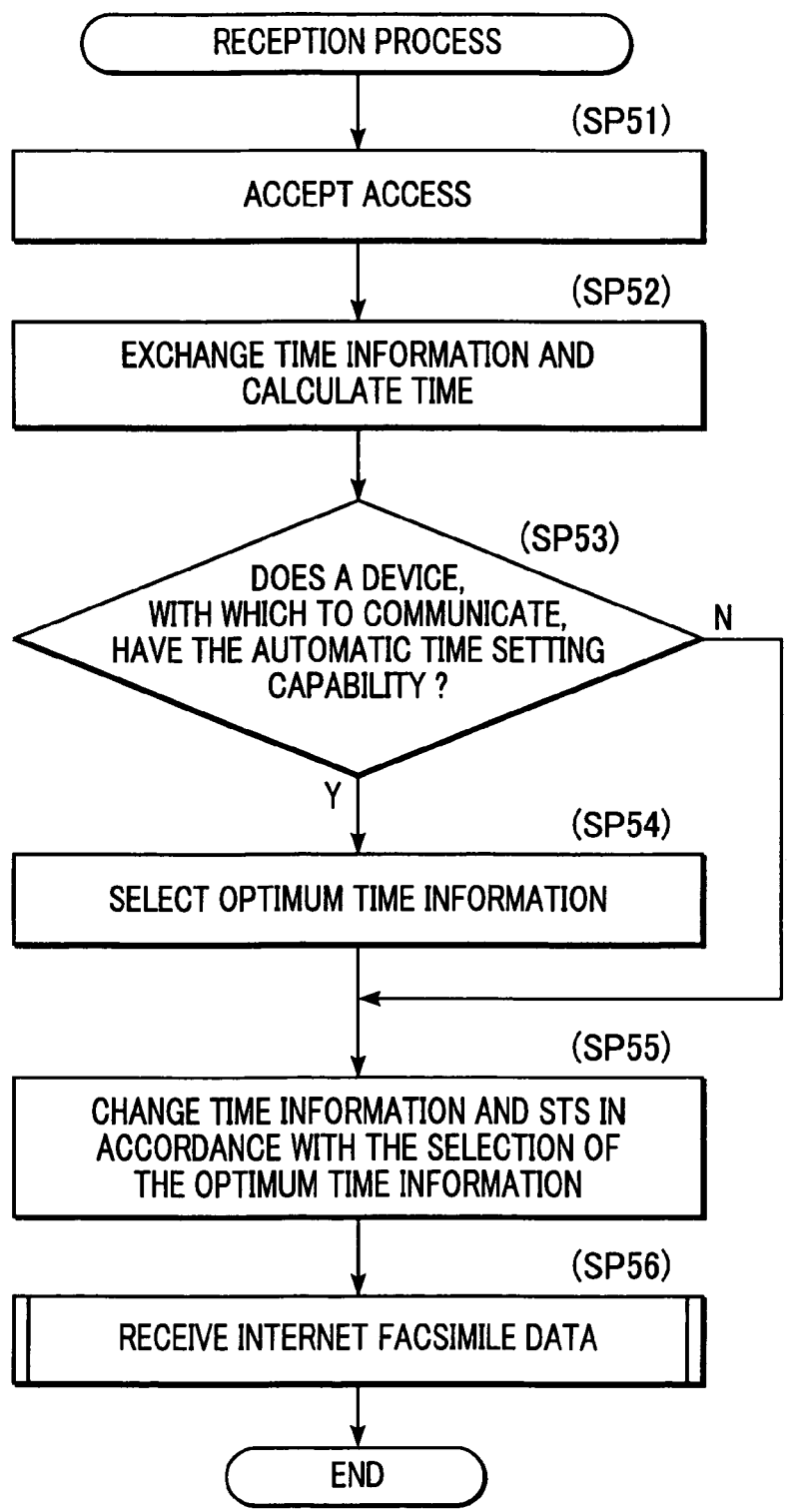
FIG. 12 is a flow chart showing a fifth data processing procedure according to the present invention.

FIG. 12 is a flow chart showing a fifth data processing procedure performed by the electronic device according to the present invention, wherein this fifth data processing procedure corresponds to a reception process performed in steps SP32 and SP34 shown in FIG. 8.

Steps SP51 to SP55 in FIG. 12 are identical to steps SP41 to SP45 in FIG. 11 and thus no detailed discussion of steps SP51 to SP55 is provided. Step SP56 in FIG. 12 is similar to step SP46 in FIG. 11, except that whereas a facsimile transmission is being performed in step SP46, a facsimile reception is being performed in step SP56.

The present embodiment of the invention is applicable not only to the facsimile device, but to another types of electric devices such as printers, scanners, multifunction image processing devices that can operate as a scanner and a printer, and portable terminals (i.e., portable telephones, digital cameras, etc.). Furthermore, the present embodiment of the invention is also applicable to a system, such as an image processing system, including a plurality of devices connected with each other via a network.

Specific examples of electronic devices or systems to which the present embodiment can be advantageously applied are described below.

EXAMPLE 1

An electronic device accesses a Web page on the Internet at a specified time to download the latest data from the Web page and print it. Depending on the status associated with date/time information, accessing to the Web page is disabled, or printing of the downloaded Web page is restricted while access to the Web page is enabled. For example, when the device is in a status in which the time information is not accurate enough, the downloaded Web page is printed in a monochrome form even if the original Web page is a color page, or storing of the downloaded Web page onto the hard disk is restricted. That is, printing of Web pages is controlled depending on the status associated with time information.

EXAMPLE 2

In a system in which a plurality of devices are connected with each other via a network such that they can communicate with each other via the network, capabilities or functions of respective devices may be restricted depending on the status associated with time information of the respective devices.

EXAMPLE 3

In a multifunction image processing device, when a print job, specified to be printed at a particular time, is input to the device, if the device is in a status in which the time information is not accurate enough, monochrome printing is performed even if color printing is specified, or the print job is stored on the hard disk without being printed. The determination as to how to deal with print jobs may be performed on the basis of an operation restriction table.

In the present embodiment of the invention, as described above, status information indicating the status in terms of setting of time information of the device using time information provision service is stored so that a user can know the status of the device and so that the operation of the device is controlled depending on the status.

It also becomes possible to restrict the operation when the accuracy of date/time information cannot be guaranteed.

In addition, no restriction may be imposed when the accuracy of date/time information cannot be guaranteed. In this case, data indicating such a status associated with setting of date/time information may be recorded in a log.

In the device using the time information provision service (the Internet facsimile machine in this specific example), the operation control screen and information including time information are displayed in an optimum manner taking into account the capabilities of the device, the processing to be performed, and the environment in which the device is used. The capabilities or functions of the device are restricted depending on the status of the device so that the device is properly used or managed and operability is improved.

Referring to FIGS. 14 to 20, other embodiments are described below.

In the embodiments described above, it is assumed that the electronic device is a Internet facsimile machine. However, the present invention is not limited to the Internet facsimile machine. In the embodiments described below, the invention is applied to an image forming apparatus in the form of a multifunction digital device having a plurality of capabilities or functions (also referred to as modes) including a copying capability, a printing capability, and a facsimile capability.

FIG. 14 is a diagram showing a system configuration according to the present embodiment. The image forming apparatus 1401 according to the present embodiment has the capability of performing data communication, via a communication medium 1400 such as a network, with various external devices such as an external device 1402 serving as a time information generator such as a server, a client computer 1403 serving as a host computer, a client computer 1404, another multifunction digital device 1405 serving as an image forming apparatus, and an Internet facsimile machine 1406 similar to that described in the previous embodiment. The image forming apparatus 1401 has a plurality of operation modes, including a copy mode, a print mode, and a facsimile mode. In this image forming apparatus 1401, job data such as job data output from a scanner unit, job data output from the client computer 1403 or 1404, job data output from a scanner unit of another multifunction digital device, or job data output from the Internet facsimile machine 1406 can be supplied to the printer unit for printing via a storage unit such as a hard disk, output to another device via the communication unit, or output-processed in a desired manner, wherein job data can be processed at a specific specified time using the time service capability if it is specified as such.

Figure 15:
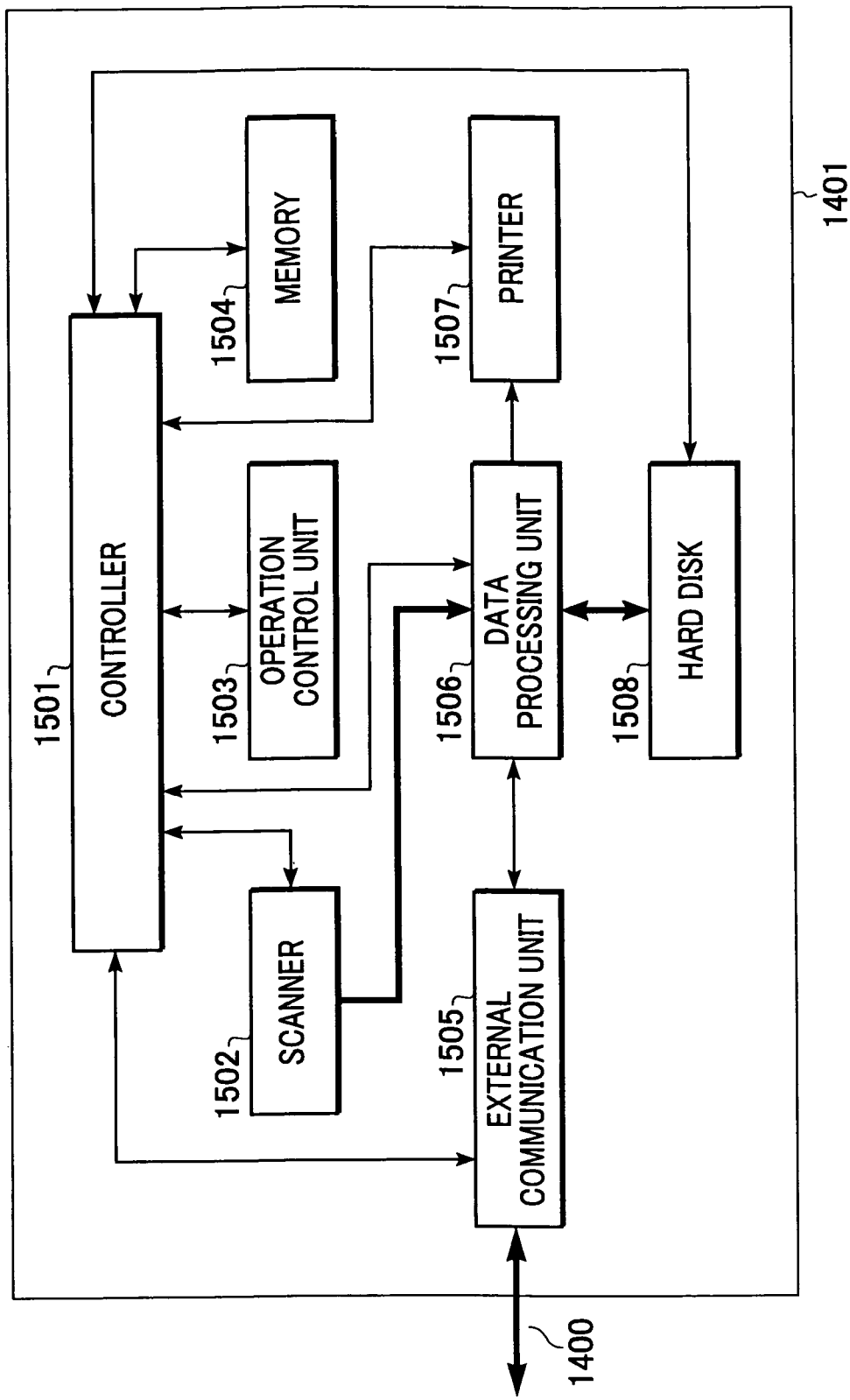
FIG. 15 is a block diagram showing another embodiment of the present invention.

FIG. 15 is a block diagram showing the construction of the image forming apparatus 1401 according to the present embodiment. The image forming apparatus 1401 according to the present embodiment includes a controller 1051, a scanner unit 1052, an operation control unit 1503, a memory 1504, an external communication unit 1505, a data processing unit 1506, a printer unit 1507, and a hard disk 1508.

The scanner unit 1502 scans an original document supplied onto a document plate from a document feeder such as an Automatic Document Feeder (ADF), and outputs the resultant image data to the data processing unit 1506. The operation control unit 1503 includes a display in the form of a touch panel and mechanical hard keys, and a user uses the operation control unit 1503 to perform various setting operations. The memory 1504 is used to store programs used by the controller 1501 to control various units, and also to store management information such as a management table that will be described later. The external communication unit 1505 transmits and receives various data (e.g., image data, command data, status request information, status information, and date/time data) to or from external devices (e.g., devices 1402 to 1406, in FIG. 14) via a communication medium such as the network 1400. The data processing unit 1506 includes a memory such as a page memory used in processing image data, a data conversion unit for converting PDL data received from the image processing unit or an external device into bitmap data, and a data compressor/decompressor for compressing/decompressing data. The data processing unit 1506 processes job data (including image data) received from the scanner unit 1502 or received from an external device via the external communication unit 1505 in accordance with specified output processing conditions, and the data processing unit 1506 outputs the resultant image data to the hard disk 1508, or the printer unit 1507, or to an external device via the external communication unit 1505. The hard disk 1508 includes a plurality of storage areas in which to store a plurality of job data (image data). In particular, the hard disk 1508 is used to store job data received from the scanner unit 1502 via the data processing unit 1506 or job data received from various external devices (for example, devices 1402 to 1406 shown in FIG. 14). The printer unit 1507 prints job data received, via the data processing unit 1506, from the scanner unit 1502, the hard disk 1508, or external devices (for example, devices 1402 to 1406 shown in FIG. 14) in accordance with specified printing conditions. The controller 1501 generally controls various units (1502 to 1508) forming the image forming apparatus 1401 so that the respective units operate properly. Although in the present embodiment, all the units are located in the image forming apparatus 1401, not all units are necessarily required to be located in the image forming apparatus 1401. Some units, for example the storage unit such as the hard disk 1508, may be located outside of the image forming apparatus 1401. All units may be located in a single case or may be separately located in different cases. For example, the scanner unit 1502 and the printer unit 1507 may be separately disposed in different cases. That is, in the present embodiment, the image forming apparatus 1401 may be configured in many ways.

In order to obtain the operation status of the above-described units, the controller 1501 transmits inquiries to and receives responses from the units. For example, from status information received from the scanner unit 1502, the controller 1501 can know whether the scanner 1502 is scanning a document or whether the scanner 1502 has a document jam. From status information from the hard disk 1508, the controller 1501 can know whether job data is being written or read to or from the hard disk 1508. From status information from the printer unit 1507, the controller 1501 can know whether the printer unit 1507 is in operation of printing or whether the printer unit 1507 has an error. From status information from the external communication unit 1505, the controller 1501 can know whether the external communication unit is transmitting or receiving data to or from the outside.

As with the previous embodiment, the image forming apparatus 1401 has the date/time information service capability. A user is allowed to manually set date/time information (first-type date/time data) via the operation control unit 1503 of the apparatus. Furthermore, the date/time information (second-type date/time data) can be set in accordance with date/time information acquired from the external time information generator (1402 in FIG. 14) with which the apparatus is capable of communicating. The operations associated with setting of the date/time information (i.e., displaying of the operation control screen, controlling of the operation mode, etc.) are performed under the control of the controller 1501. In response to a command issued by a user, the controller 1501 sends a request for date/time data to the external device 1402 serving as the external time information generator (also called the date/time information server) via the network 1400. In response to the request, the external device 1402 returns accurate date/time data to the image forming apparatus 1401. The image forming apparatus 1401 sets the date/time information on the basis of the received data. In the present embodiment, the controller 1501 of the image forming apparatus 1401 may acquire date/time data from the external time information generator by issuing a request for date/time data to the external time information generator as described above, or the external time information generator 1402 may send date/time data to the image forming apparatus 1401 at scheduled intervals so that the image forming apparatus 1401 can acquire date/time data from the external time information generator 1402 without having to issue the request for the date/time data. In a case in which a user of the image forming apparatus 1401 issues a request for external date/time data via a user interface such as the operation control unit 1503, the image forming apparatus 1401 immediately performs an operation to acquire date/time data from the external device 1402. On the basis of the date/time data acquired from the external device 1402, the controller 1501 displays various kinds of information on the operation control unit 1503 and, if necessary, restricts the capability or the operation mode of the image forming apparatus.

The controller 1501 includes a timer unit. For example, if date/time data is manually input via the operation control unit, the controller 1501 measures the passage of time in units of seconds from the input date/time by using the timer unit, and the controller 1501 reflects the measurement result in the date/time information. For example, the controller 1501 displays the current date/time on the operation control unit 1503 on the basis of the date/time information obtained by the measurement. In the case in which the date/time is set on the basis of the date/time data acquired from the outside, the controller 1501 similarly measures the passage of time in units of seconds from the input date/time by using the timer unit, and the controller 1501 reflects the measurement result in the date/time information.

The operation control unit 1503 that operates under the control of the controller 1501 is described below with reference to FIG. 16. The operation control unit 1503 includes a display 1601 and a mechanical hard key unit 1602. The display 1601 is formed of a liquid crystal touch panel capable of displaying various kinds of information and capable of responding to touching soft keys displayed on the panel. Note that the user interface is not limited to such a touch panel, but another type of user interface may also be employed. For example, as with a printer driver, keys of the user interface may be clicked in response to an operation performed on a pointing device such as a mouse. That is, the operation control unit 1503 may be formed in an arbitrary manner as long as it has the capability of displaying necessary information and the capability of accepting a command issued by a user.

If a key 1603 is pressed by a user, the power of the image forming apparatus 1401 is turned on or off. If a start key 1604 is pressed by a user, processing of a job specified by the user is started. Numerical keys 1605 are used to input numeric data. If a user key 1606 is pressed, a user mode setting screen for use in various kinds of settings such as initial setting, manager setting, and timer setting is displayed. The hard key unit 1602 also includes an indicator for informing a user that data is being received, an indicator that blinks when an error occurs thereby informing the user that error has occurred, and an indicator for informing the user that the power is in the on-state.

Referring to FIG. 17, examples of operation control screens, which are displayed on the display 1601 of the operation control unit 1503 under the control of the controller 1501, are described below.

Figure 17A:
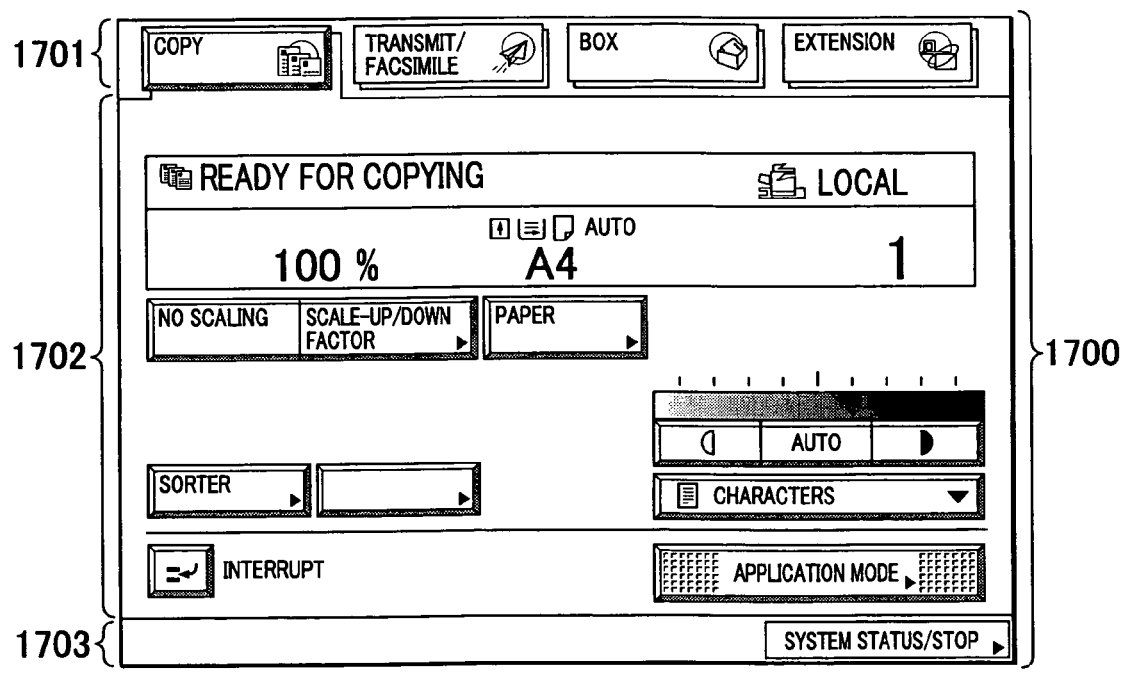
FIG. 17 is a diagram showing an operation control screen according to an embodiment of the present invention.

FIG. 17A shows an example of an operation control screen 1700 displayed on the display 1601. In this example, the operation control screen 1700 includes the following three elements: (1) a function selection area 1701 in which there are disposed functions keys for use by a user to select an operation mode of the image forming apparatus 1401 from a plurality of operation modes including a copy mode, a transmission mode, a facsimile mode, box mode, and an extension mode; (2) a process condition setting area 1702 including control keys for use by a user to specify various processing conditions (e.g., parameters associated with printing) for job data (image data) to be processed in an operation mode selected in the function selection area 1701; and (3) a status display area 1703 for displaying various kinds of status information indicating the operation status of the image forming apparatus 1401 (e.g., image data is being read, image data is being printed, error information indicating an occurrence of a document jam, a printing paper jam, or a staple jam, or warning information indicating shortage of toner or paper). The contents of the process condition setting area 1702 are modified depending on the mode selected in the function selection area 1701. The function selection area 1701 is controlled such that this area is always accessible regardless of the type of the operation control screen that is currently displayed. More specifically, the function selection area 1701 is always displayed even when the current operation control screen is changed to another operation control screen, thereby allowing a user to select an operation mode. The status display area 1703 is always displayed regardless of which operation control screen is displayed, so that status information associated with the image forming apparatus is always displayed. More specifically, the status display area 1703 is always displayed even when the current operation control screen is switched to another operation control screen.

In the copy mode of the image forming apparatus 1401, job data (also referred to as image data) output from the scanner unit 1502 is supplied to the printer unit 1507 via a memory such as the hard disk 1508, and the printer unit 1507 performs printing in accordance with the received job data. In the external data print mode, job data received from an external device such as the client computer 1403, the client computer 1404, the multifunction digital device 1405, or the facsimile machine 1406, is supplied to the printer unit 1507 via the memory such as the hard disk 1508, and the printer unit 1507 performs printing in accordance with the supplied job data. In the box mode, job data output from the scanner unit 1502 or job data received from an external device (external devices 1403 to 1406), is stored in a storage area (box area) of the hard disk 1508, and a particular job data selected via the operation control unit 1503 is read from the box area and printed by the printer unit 1507 or transferred to an external device via the external communication unit 1505. In the present embodiment, as described above, the image forming apparatus has a plurality of operation modes, including at least the two operation modes described above. Note that the number of operation modes is not essential to the present invention. For example, the present invention may also be applied to a single-function image forming apparatus having only one operation mode.

In the image forming apparatus 1401 according to the present embodiment, date/time information is displayed on the display 1601 under the control of the controller 1501. Furthermore, a message is displayed on the display 1601 under the control of the controller 1501 to notify a user whether date/time information used by the image forming apparatus 1401 has already been set. If the date/time information has already been set, notification is also provided as to whether the date/time information is based on date/time data (first-type date/time data) manually set by a user via the operation control unit 1503 of the image forming apparatus 1401 or based on date/time data (second-type date/time data) supplied from the external time information generator (e.g., the external server 1402). Note that the display 1601 is merely one example of the notification unit, and the notification unit may be realized in various manners. For example, notification information described above may be provided to a user by using a voice unit that outputs voice notification. Various operation control screens are displayed on the operation control unit 1503 under the control of the controller 1501 as described below with reference to FIGS. 17B to 17H.

In the present embodiment, the controller 1501 detects and manages the status information associated with time information on the basis of time data set by a user via the operation control unit 1503, time data stored in the memory 1504, and time data supplied from the external time information generator (such as the time information server 1402 shown in FIG. 14) via the external communication unit 1505. The controller 1501 displays status information indicating the current status of the image forming apparatus 1401 on the display 1601 and restricts the operation mode depending on the current status. More specifically, the image forming apparatus 1401 can be in one of the following statuses:

(1) a first status (first date/time status) in which date/time data used by the image forming apparatus 1401 has not been set either manually by a user or automatically by accessing the date/time information server. That is either first-type date/time data or second-type date/time data is used in the image forming apparatus 1401.

(2) a second status (second date/time status) in which date/time information used by the image forming apparatus 1401 has already been set, wherein the setting of the date/time information has been performed on the basis of date/time data (first-type date/time data) manually input by a user via the operation control unit 1503 of the image forming apparatus 1401, and the image forming apparatus 1401 is in operation on the basis of the date/time information. That is, date/time information based on the first-type date/time data is currently used in the image forming apparatus 1401).

(3) a third status (third date/time status) in which date/time information used by the image forming apparatus 1401 has already been set, wherein the setting of the date/time information has been performed on the basis of date/time data (second-type date/time data) acquired from the external time information generator (such as the external server 1402), and the image forming apparatus 1401 is in operation on the basis of the date/time information that is highly reliable with high accuracy. That is, date/time information based on the second-type date/time data is currently used in the image forming apparatus 1401.

(4) a fourth status (fourth date/time status) in which although date/time information used by the image forming apparatus 1401 has already been set, the date/time information is not accurate enough and thus it is necessary to calibrate the date/time information (i.e., adjusted to a correct date/time), and the image forming apparatus 1401 is in operation using the date/time information that needs calibration. That is, the date/time information currently used by the image forming apparatus 1401 needs to calibrated.

In the image forming apparatus 1401 according to the present embodiment, as described above, the controller 1501 deals with the status information to indicate the current status of the image forming apparatus 1401, wherein the status can be one of the plurality of statuses described above.

Figure 17B:
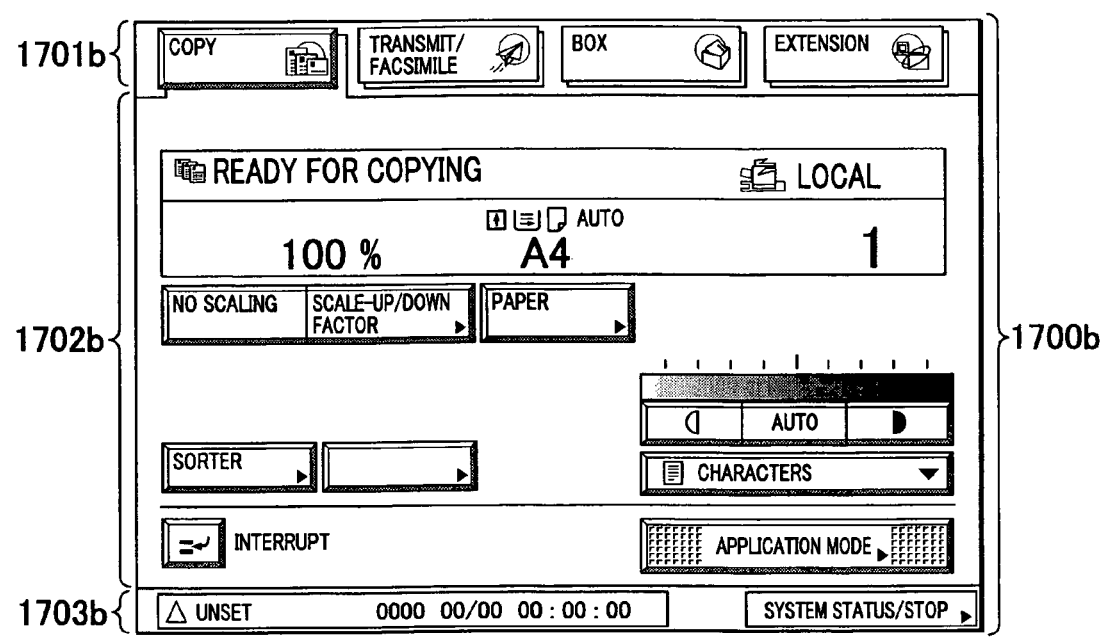

In the case in which the controller 1501 determines that the image forming apparatus 1401 is currently in the first status associated with the date/time information, the controller 1501 displays a message indicating that the image forming apparatus 1401 is in the first status in the status display area of the operation control screen displayed on the display 1601 For example, the status display area 1703b in the operation control screen 1700b shown in FIG. 17B.

Figure 17C:
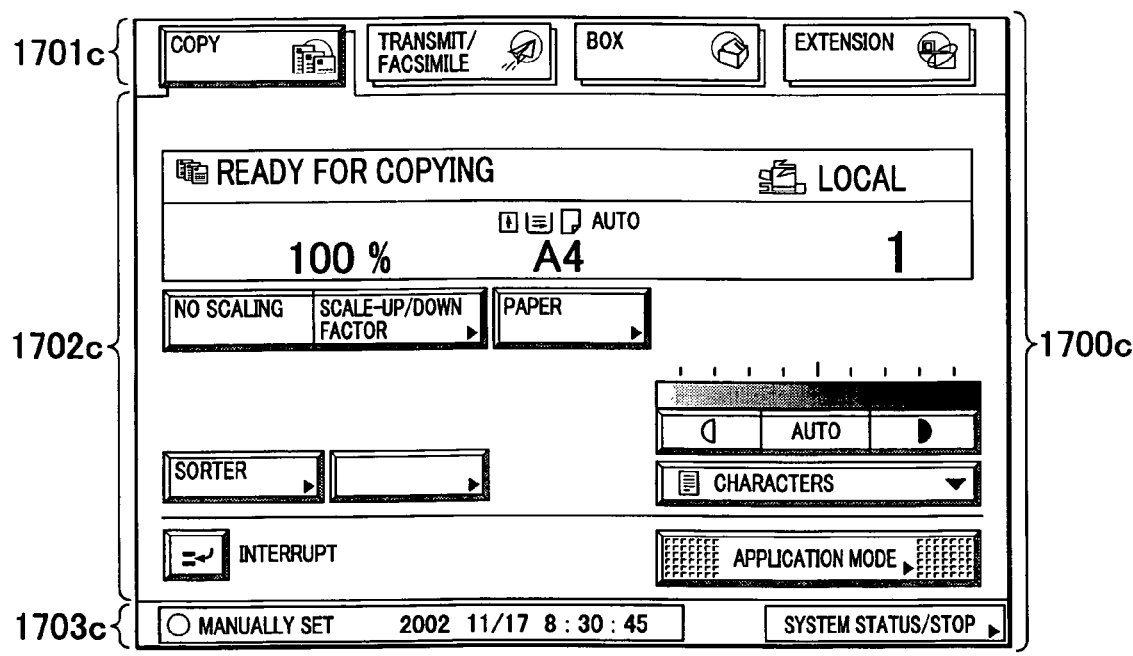

In the case in which the controller 1501 determines that the image forming apparatus 1401 is currently in the second status associated with the date/time information, the controller 1501 displays a message indicating that the image forming apparatus 1401 is in the second status in the status display area of the operation control screen displayed on the display 1601 For example, the status display area 1703c in the operation control screen 1700c shown in FIG. 17C.

Figure 17D:
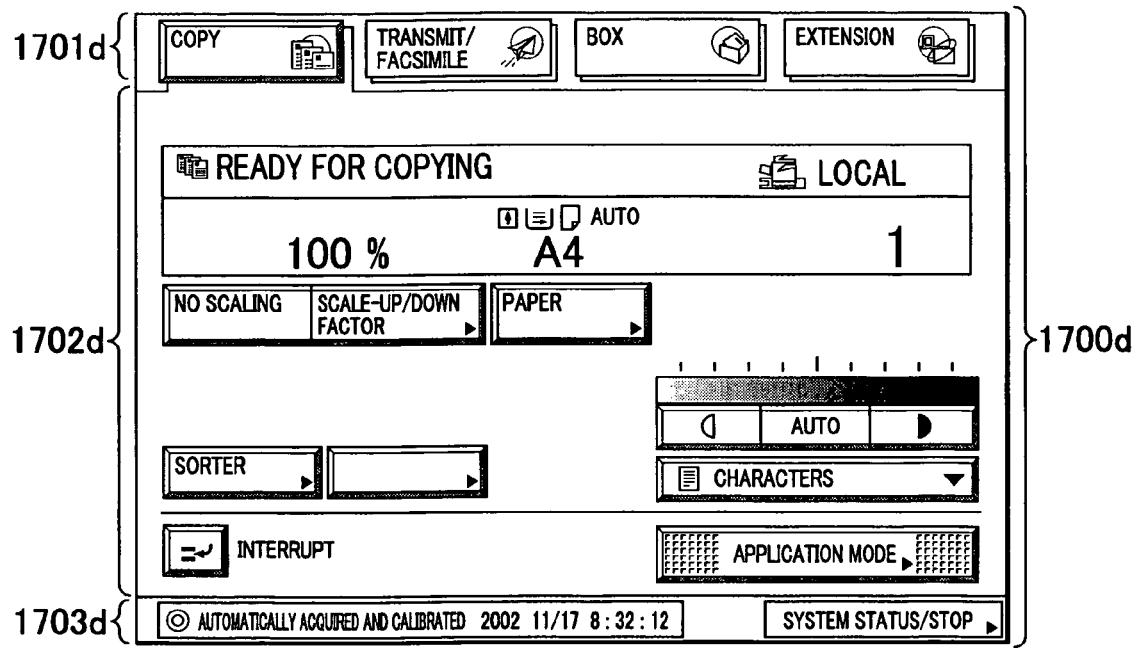

In the case in which the controller 1501 determines that the image forming apparatus 1401 is currently in the third status associated with the date/time information, the controller 1501 displays a message indicating that the image forming apparatus 1401 is in the third status in the status display area of the operation control screen displayed on the display 1601 For example, the status display area 1703d in the operation control screen 1700d shown in FIG. 17D.

Figure 17E:
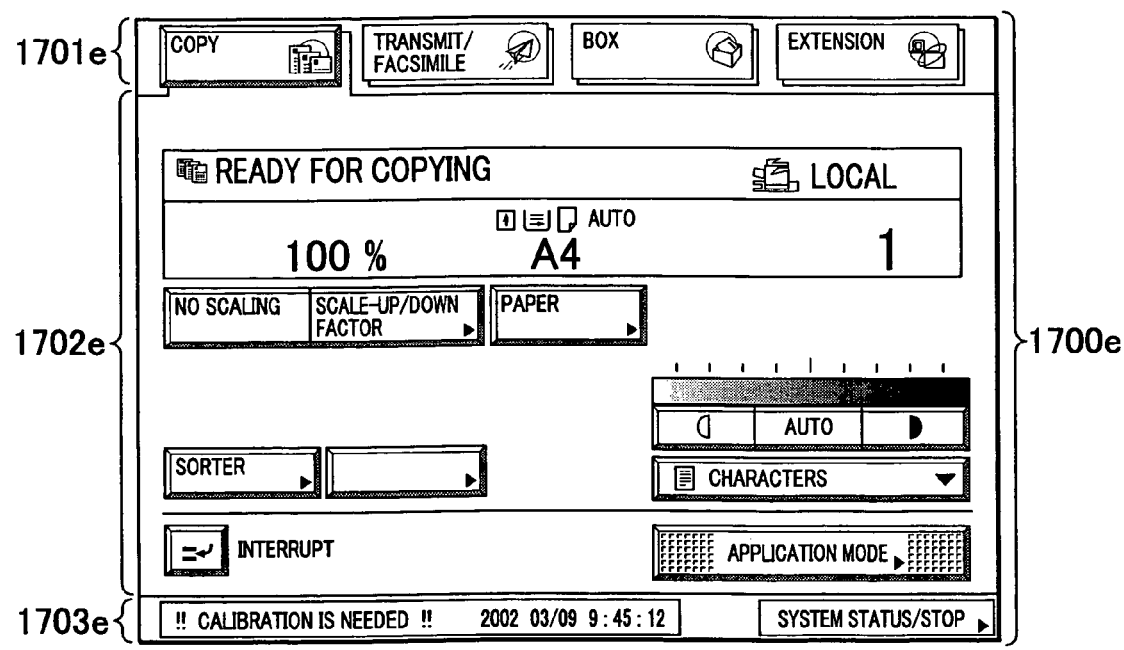

In the case in which the controller 1501 determines that the image forming apparatus 1401 is currently in the fourth status associated with the date/time information, the controller 1501 displays a message indicating that the image forming apparatus 1401 is in the fourth status in the status display area of the operation control screen displayed on the display 1601 For example, the status display area 1703e in the operation control screen 1700e shown in FIG. 17E.

As described above, the controller 1501 displays a notification message on the notification unit so that a user is informed as to which one of the plurality of statuses associated with date/time information the image forming apparatus 1401 is currently in.

In the present embodiment, as described above, the image forming apparatus 1401 has a plurality of operation modes (capabilities) including the copy mode and the box mode, and the operation control screen displayed on the display 1601 varies depending on the selected operation mode under the control of the controller 1601. This enables a user to easily input data or issue a command via the operation control screen.

That is, in the present embodiment, the operation control screen is designed such that the improvement in operability in respective operation modes is achieved, and such that status information associated with time information is displayed to inform a user of the current status of the device thereby allowing the user to use the device in a convenient manner, as described below with reference to specific examples.

As described above, the image forming apparatus 1401 according to the present embodiment has a plurality of operation modes that can be selected using mode selection keys (e.g., a copy key, a transmit/fax key, a box key, an extension key, in the example shown in FIG. 17) provided in the mode selection area 1701 in the operation control screen. If one of those mode selection keys is selected, the controller 1501 switches the contents of the operation control screen displayed on the display 1601 to those corresponding to the selected mode. The user, via the operation control unit 1503, can specify a desired operation control screen corresponding to a particular mode as an initial operation control screen. The operation control screen corresponding to the copy mode is specified as the initial operation control screen in this specific example.

The controller 1501 displays status information associated with time information on the display while maintaining the operation control screen displayed on the display.

For example, in the case in which the image forming apparatus 1401 is currently in the second status associated with date/time information, and the copy mode is selected as a default mode, the controller 1501 displays the operation control screen on the display 1601 as shown in FIG. 17C such that the mode selection area 1701c, the process condition setting area 1702c for use in setting process conditions in the copy mode, and the status display area 1703c including the notification message indicating that the image forming apparatus 1401 is in the second status are displayed.

In this state, for example, if a user selects a transmit/fax key in the mode selection area 1701c on the operation control screen 1700c, the controller 1501 switches the current operation control screen displayed on display 1601 into the operation control screen adapted to the transmit/fax mode. The controller 1501 also displays a notification message on the display 1601 to notify the user that the image forming apparatus 1401 is in the second status associated with date/time information. More specifically, in this case, as shown in FIG.

17F, the controller 1501 displays, on the display 1601, the following three areas all together: the mode selection area 1701*f*; the process condition setting area 1702*f* for use in setting the processing conditions in the transmit/fax mode; and the status display area 1703*f* including the notification message indicating that the image forming apparatus 1401 is in the second status.

Figure 17F:
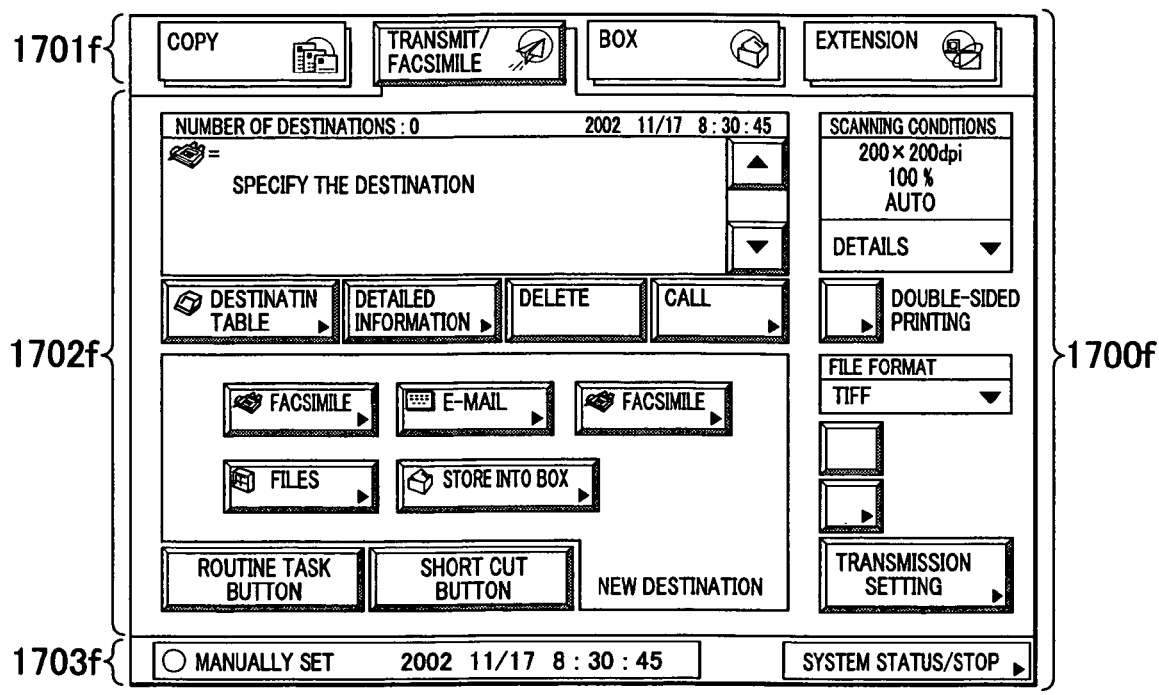

That is, via the operation control screen 1700*f* displayed under the control of the controller 1501 as shown in FIG. 17F, the user is informed that the image forming apparatus 1401 is currently in the second status associated with date/time information, and the user can set processing conditions (e.g., parameters associated with transmission, such as a destination, a transmission form, a condition of reading a document, a file format, a stamp, and a job completion notification) for job data to be transmitted in the transmit/fax mode, in the process condition setting screen 1702. If the user selects the start key 1604 after completion of the setting associated with transmission conditions, the external communication unit 1505 transmits the job data in accordance with the conditions specified by the user.

In a case in which the image forming apparatus 1401 is currently in the third status associated with date/time information, and the copy mode is selected as the default mode on the initial screen, the controller 1501 controls the operation control unit 1503 such that the mode selection area 1701*d*, the process condition setting area 1702*d* for use in setting process conditions in the copy mode, and the status display area 1703*d* including the notification message indicating that the image forming apparatus 1401 is in the third status are displayed on the display 1601 as shown in FIG. 17D.

In this state, if a user selects the box key in the mode selection area 1701*d* on the operation control screen 1700*d*, the controller 1501 switches the current operation control screen displayed on display 1601 into the operation control screen adapted to the box mode. The controller 1501 also displays a notification massage on the display 1601 to notify the user that the image forming apparatus 1401 is in the third status associated with date/time information. More specifically, in this case, the controller 1501 controls the display 1601 such that the mode selection area 1701*g*, the process condition setting area 1702*g* for use in setting process conditions in the box mode, and the status display area 1703*g* including the notification message indicating that the image forming apparatus 1401 is in the third status are displayed on the display 1601 as shown in FIG. 17G.

In the box mode, at least a part of the storage area of the hard disk 1508 of the image forming apparatus 1401 is allocated as the box area, and the box area is divided into a plurality of boxes. The boxes are assigned to respective users so that a plurality of job data (image data) can be stored in each box. More specifically, job data output from the scanner unit 1502 or job data received from an external device (external devices 1402 to 1406) can be stored in a selected box (such an operation is referred to as reading into box). When job data stored in a box is output, a user selects a box from the plurality of boxes via the operation control unit 1503 and job data from the selected box. The user further sets processing conditions to be applied to the selected job data. Thereafter, in response to an output command in the box mode issued via the operation control unit 1503, the job data selected by the user is read from the selected box and transmitted to the outside or printed by the printer unit in accordance with the processing conditions specified by the user for the job (the process is referred to as an output-from-box process).

Figure 17G:
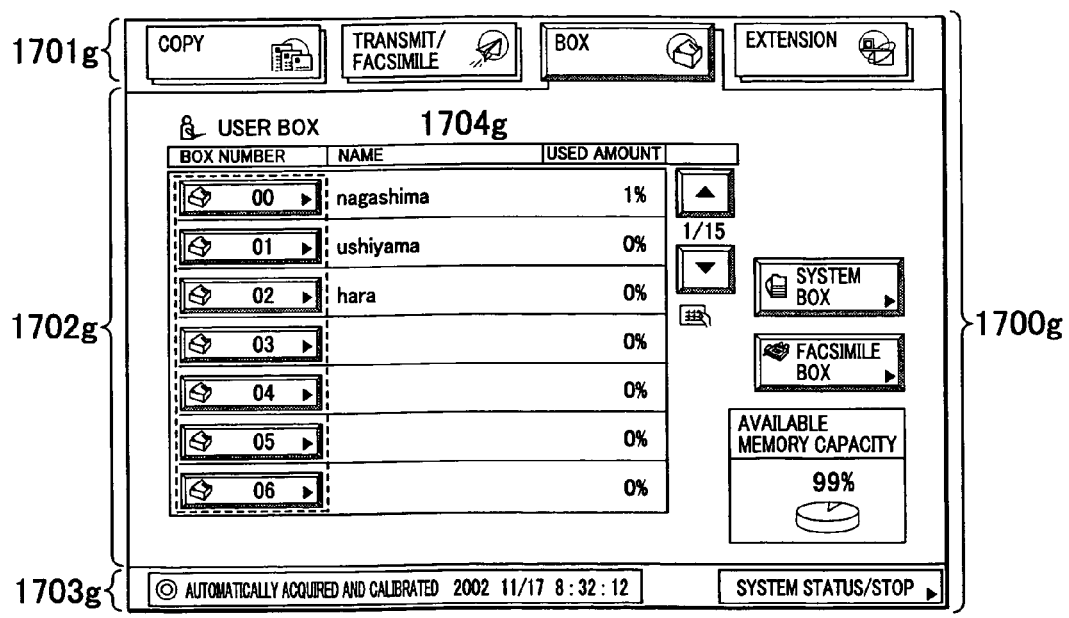

Thus, via the operation control screen 1700*g* displayed under the control of the controller 1501 as shown in FIG. 17G, the user is informed that the image forming apparatus 1401 is currently in the third status associated with date/time information, and the user can set processing conditions (e.g., parameters associated with the operation in the box mode such as selection of a box, selection of a job from the selected box, and output processing conditions to be applied to the selected job) for job data to be output in the box mode in the process condition setting area 1702*g*.

Figure 17H:
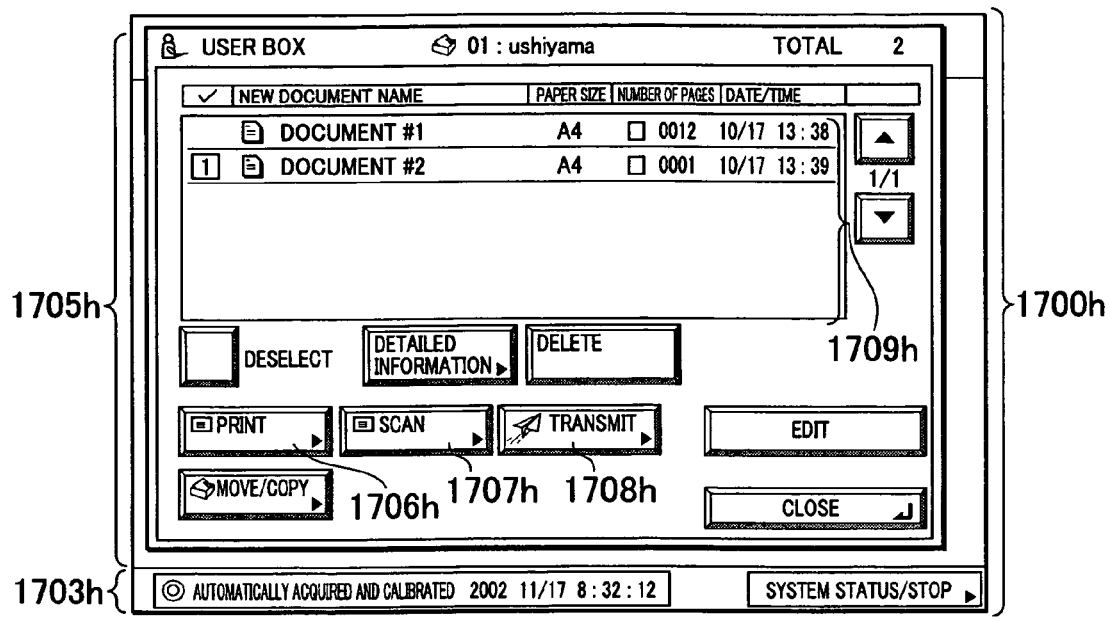

When a job data is stored in a box in the box mode (store-into-box process), a user selects a desired box from the plurality of boxes (e.g., 100 boxes) formed on the hard disk 1508 by clicking a box key in the box selection area 1704*g*. In this specific example, it is assumed that a box with box number 1 has been selected. In response to selection of a box, the controller 1501 displays a job selection screen 1700*h* for use in selecting a job from the selected box on the display 1601 as shown in FIG. 17H. In this specific case, the image forming apparatus 1402 is in the third status associated with date/time information as described above, and the controller 1501 controls the display 1601 such that the job selection screen 1700*h* for use in the box mode is displayed on the display 1601 while maintaining the notification message so as to indicate that the image forming apparatus 1401 is in the third status.

The job selection screen 1700*h* includes a list display area 1709*h* having the capability of displaying information associated with jobs stored in boxes (i.e., job name, paper size, number of pages, storage date/time, etc.) and the capability of allowing a user to select a job from a desired box. In the example shown in FIG. 17H, two jobs (two sets of image data) have already been stored in the box, wherein one job includes 12 pages and the other job includes 1 page. As shown, a user can obtain job information, such as storage date/time information indicating the date/time at which each job has been stored in the corresponding box, associated with the jobs stored in a particular box via screen 1700*h*. If a user selects scan key 1707*h*, the controller 1501 starts the store-into-box process to store job data received from, in this example, the scanner unit 1502 into the selected box. In this specific case, if the store-into-box process is completed, information associated with job data from the scan operation is displayed in the list below the second job already stored.

In the output-from-box process, a user selects a box via the screen 1700*g* shown in FIG. 17G (in this specific example shown in FIG. 17G, it is assumed that a box with box number 1 has been selected). In response to selecting a box, a job selection screen 1705*h* for use in selecting a job from the selected user box is displayed. Via a list display area 1709*h*, the user selects a desired job. In this specific example, a job second in the list display area 1709*h* is selected. After selecting the job, if, for example, a print key 1706*h* is pressed by the user, the selected job is printed by the printer unit 1507 in accordance with the specified printing conditions under the control of the controller 1501. On the other hand, in the case in which a transmit key 1708*h* is pressed by the user after selecting a job, the selected job is transmitted to the outside via the external communication unit 1505 in accordance with specified transmission conditions under the control of the controller 1501. In the present embodiment, a user can set the output conditions associated with respective jobs in two ways. First, when job data is stored in a box, output conditions to be applied to that job data are determined, and output condition data indicating the output conditions is stored in the box together with the job data. When the job is output, the outputting of the job is performed in accordance with the output conditions indicated by the output condition data stored in the box. Second, a condition setting screen (not shown) is displayed. Via this setting screen, a user can set or change output conditions associated with a selected job.

As can be understood from the above description, when the controller switches the current operation mode into another operation mode in response to an operation performed by a user (i.e., when the current operation control screen for use in a certain mode displayed on the display 1601 is switched into another operation control screen for use in another mode), the status information indicating the current status associated with date/time information used by the image forming apparatus 1401 is always displayed in the status display area 1703 on the display 1601 so that the user is informed of the current status associated with date/time information regardless of which operation control screen is currently displayed. For example, in the above-described example in which when the status associate with date/time information is in the second status, even if the screen displayed on the display 1601 is switched by the controller 1501 from the operation control screen 1700c for use in the copy mode shown in FIG. 17C to the operation control screen 1700f for use in the transmit/fax mode, displaying of the status information is continued. In addition, when the status associated with date/time information is in the third status, even if the screen displayed on the display 1601 is switched by the controller 1501 from the operation control screen 1700d for use in the copy mode shown in FIG. 17D to the operation control screen 1700g for use in the box mode shown in FIG. 17G, displaying of the status information continues.

Furthermore, in the case in which in the same operation mode, a user performs setting using a plurality of operation control screens, even when the current operation control screen displayed on the display 1601 is switched to another operation control screen, the controller 1501 controls the display 1601 such that the status information indicating the current status associated with date/time information is always displayed in the status display area 1703 on the display 1601 thereby informing the user of the current status associated with date/time information any time the user wishes to know the current status. For example, in the above-described example in which when the status associate with date/time information is in the third status, even if the screen displayed on the display 1601 is switched from the operation control screen 1700g for use in the box mode shown in FIG. 17G to the operation control screen 1700h for use also in the box mode shown in FIG. 17H, displaying of the status information is continues.

In the box mode according to the present embodiment, a password or authentication data, which may be stored in an IC card or the like, can be set for each box. Some boxes may be assigned passwords or authentication data, while some boxes may not. When a user access a particular box for the purpose of store-into-box or output-from-box process, in the case in which it is required to input authentication data to use that box access to that box is allowed only when the authentication data corresponding to that box is input via the operation control screen. On the other hand, in the case in which no authentication data is required to use the box, the user is allowed to access the box without having to input authentication data.

In the present embodiment, as described above, not only is status information displayed to inform the user of the current status of the device in terms of time information, but the operation control screen is also displayed, taking into account that the time service can be provided and the device has the plurality of operation modes. This enables the user to easily use the various capabilities or functions of the device by inputting data or issuing a command via the operation control screen that is switched/modified depending on the operation mode. When necessary, the user is allowed to input data or issue a command over a plurality of operation control screens in the same mode. This makes it possible to effectively use the capabilities or functions of the device using the time service. In particular, the present embodiment of the invention is very useful when it is applied to a multifunction device having the time service capability.

In the operation control screen according to the present embodiment, the mode selection area 1701 and the process condition setting area 1702 are formed in a single screen area, and the status display area 1703 is formed in another screen area. Alternatively, those three display elements may be formed in a single screen area or they may be formed separately in different screen areas. In any case, display elements are designed so that a user can obtain information about the current status associated with time information in real time whenever the user needs the information, regardless of the current operation mode and regardless of whether the operation control screen corresponding to the current operation mode (e.g., copy mode) is switched to another operation control screen corresponding to another operation mode (e.g., facsimile mode).

The operation performed by a user to set the first-type time data used by the image forming apparatus 1401 and the operation to set the second-type time data are described below with reference to FIG. 18.

Figure 16:
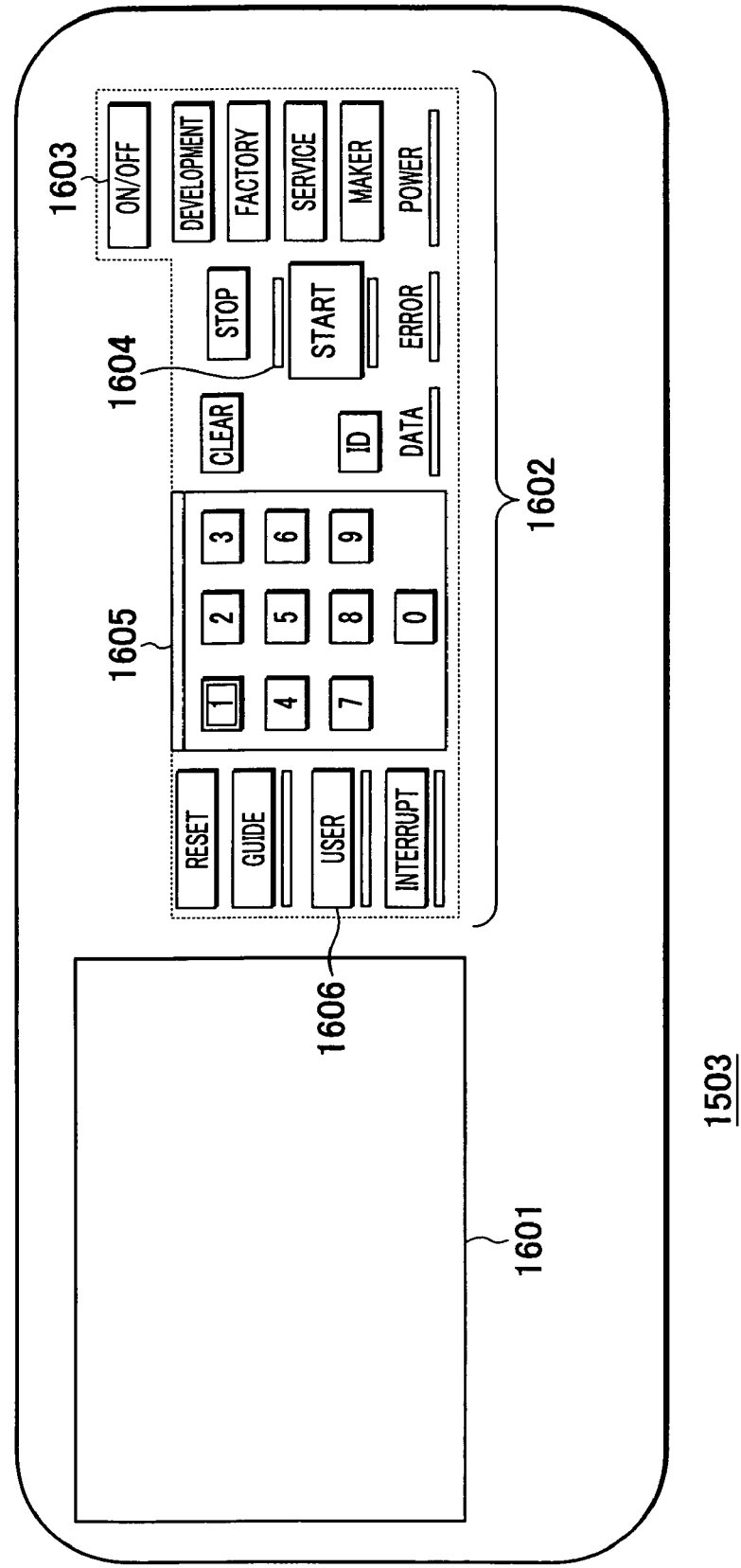
FIG. 16 is a diagram showing an operation control unit according to an embodiment of the present invention.
Figure 18A:
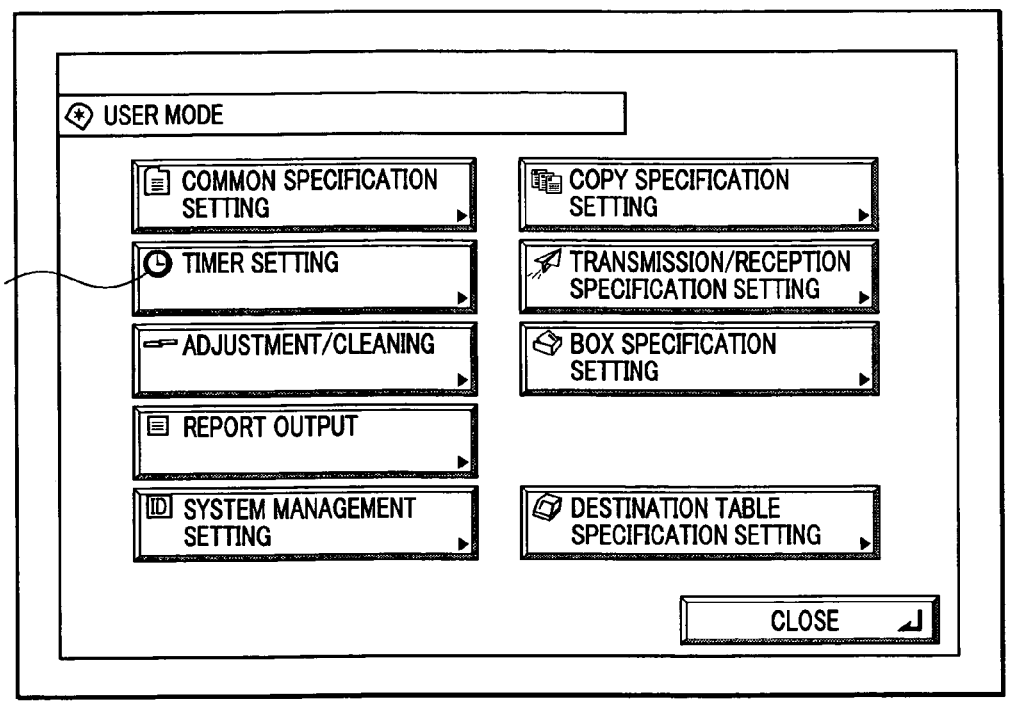
FIG. 18 is a diagram showing an operation control screen according to an embodiment of the present invention.

If a user mode key 1606 on the operation control unit 1503 shown in FIG. 16 is selected by a user, the control unit 1501 displays a user mode setting screen 1800a on the display 1601 as shown in FIG. 18A for use by the user for performing common settings.

Figure 18B:
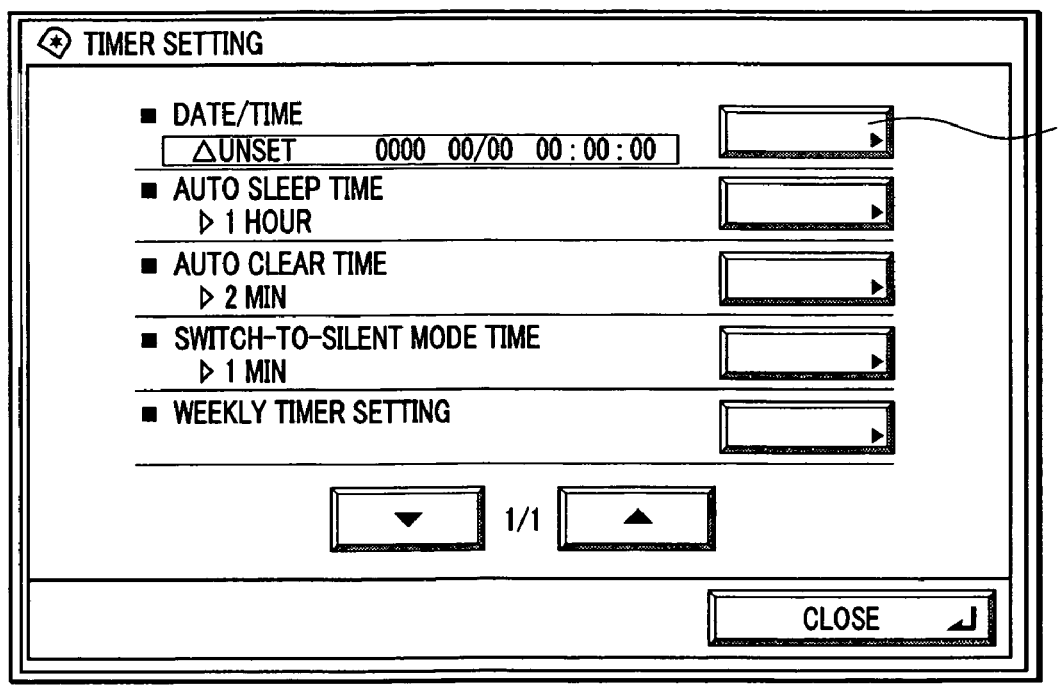

In the user mode setting screen 1800a, if a timer setting key 1801a is selected by the user, the controller 1501 displays a timer setting screen 1800b on the display 1601 as shown in FIG. 18B.

Figure 18C:
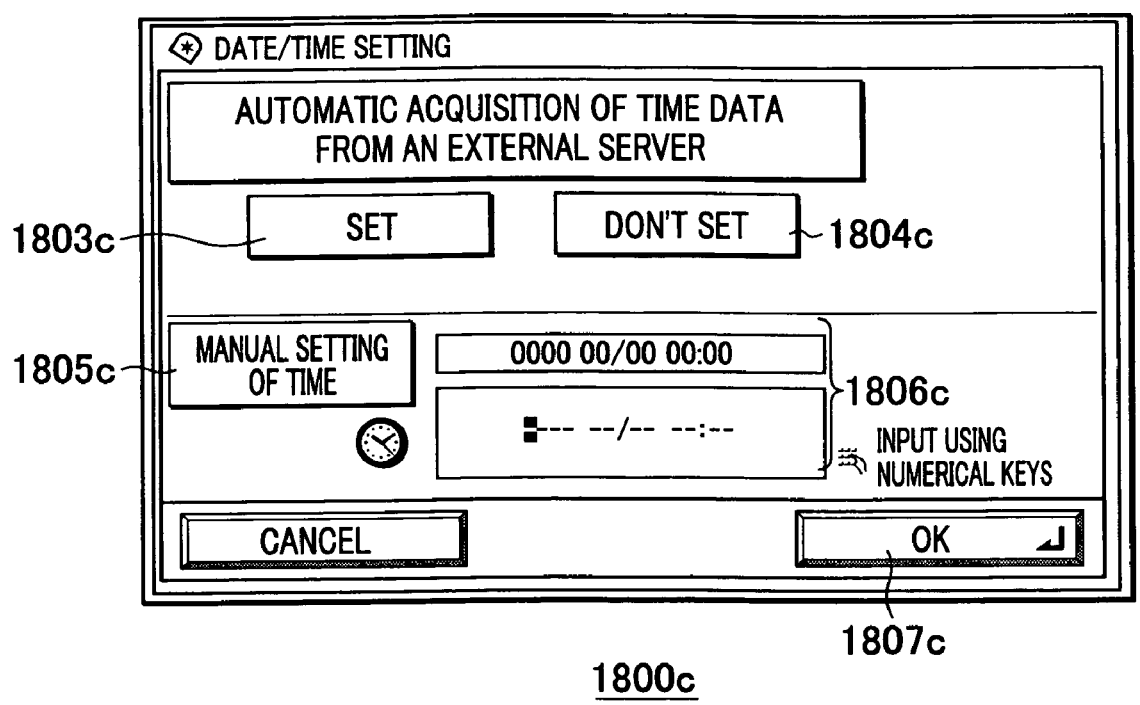

When the timer setting screen 1800b is displayed on the display 1601, the controller 1501 displays a date/time setting key 1802b and also a notification message indicating the current status associated with date/time information used by the image forming apparatus 1401. In the present example, the current status associated with date/time information is in the first status. Herein, if the date/time setting key 1802b is selected, the controller 1501 displays, on the display 1601, a date/time setting screen 1800c, including keys 1803c to 1805c as shown in FIG. 18C, thereby allowing the user to select whether date/time data is to be manually set by the user or automatically set by accessing the external time information generator.

After the key 1803c on the screen 1800c is selected, if a OK key 1807c is selected by the user, the controller 1501 determines that the user has selected that date/time data should be automatically acquired from the outside. The controller 1501 acquires data/time data from the external time information generator (i.e., the time information generator 1402 shown in FIG. 14) via the network 1400 and the acquired date/time data may be displayed on the display 1806c. Thereafter, the controller 1501 displays date/time information on the basis of the acquired date/time data and controls the image forming apparatus 1401 so as to operate on the basis of the acquired date/time data. In the case where the key 1804c is selected followed by the OK key 1807c, the controller 1501 disables the image forming apparatus 1401 to acquire data/time data from the outside.

If the key 1805c is selected by the user, the controller 1501 determines that manual setting of date/time data is requested, and the controller 1501 prompts the user to input time data via the time information setting area 1806*c* and the numeric keys 1605. Thereafter, if the OK key 1807*c* is selected, the controller 1501 displays date/time information on the basis of the manually input date/time data and controls the image forming apparatus 1401 so as to operate on the basis of the manually input date/time data. If the user selects any one of keys 1803*c* to 1805*c*, the controller 1501 determines that the date/time data is unset.

The controller 1501 stores the setting information input by the user via the date/time setting screen into the memory 1504 as initial setting information. In a case in which no keys on the date/time setting screen are operated by the user, and neither first-type date/time data nor second-type date/time data is input, the controller 1501 determines that the status of the image forming apparatus 1401 in terms of date/time information is in the first state. In the case in which a user sets date/time data via the key 1805*c*, the controller 1501 determines that the status of the image forming apparatus 1401 in terms of date/time information is in the second state. In the case in which automatic acquisition of date/time data from the outside has been selected by a user via the key 1803*c*, and date/time data has been successfully acquired from the external time information generator, and furthermore, the image forming apparatus 1401 is in correct operation on the basis of the acquired date/time data, the controller 1501 determines that the status of the image forming apparatus 1401 in terms of date/time information is in the third state. In the case in which the controller 1501 determines that although a user has issued an automatic date/time data acquisition request by selecting the key 1803*c*, acquisition of date/time data from the external time information generator is impossible or adjustment (calibration) of date/time information is failed, the controller 1501 determines that the status of the image forming apparatus 1401 in terms of date/time information is in the fourth state. On the basis of the determination in terms of the status associated with date/time information, the controller 1501 controls displaying of the operation control screens (1700*b* to 1700*h* shown in FIG. 17) and restricts the operation mode of the image forming apparatus 1401.

The control of the operation mode of the image forming apparatus 1401 by the controller 1501 is described in further detail below. As described above, the image forming apparatus 1401 has a plurality of operation modes including at least one of a copy mode, transmit/fax mode, printer mode, and box mode. In each mode, a plurality of parameters indicating processing conditions to be applied to each job data can be set (i.e., in the copy mode, for example double-sided printing, stapling, and a N-in-1 format may be set for a particular job data).

In the image forming apparatus 1401 constructed in the above-described manner, when job data specified by a user is processed in response to a job processing request issued by the user, the controller 1501 performs an operation mode determination process to determine in which operation mode of the plurality of operation modes to process the job data. Furthermore, the controller 1501 determines processing conditions to be applied to the job data. The controller 1501 also performs a date/time status detection process to determine which one of the first to fourth statuses associated with date/time information the image forming apparatus 1401 is in. On the basis of the results of the determination processes described above, and also on the basis of the restriction rule described in the enabled/disabled operation table such as that shown in FIG. 19 and stored as the management data in the memory 1504, the controller 1501 determines whether to permit execution of the job data. FIG. 19 depicts what operation modes are enabled or disabled, in respective first to fourth statuses. FIG. 19 also shows what processing conditions are allowed or prohibited in respective operation modes and in respective statuses. As required, a user is able to modify the data in the enabled/disabled operation table shown in FIG. 19.

For example, according to the enabled/disabled operation table shown in FIG. 19, in the third status associated with date/time information used by the image forming apparatus 1401, all operation modes of the image forming apparatus 1401 are enabled. In the second status, of the plurality of operation modes, the first operation mode and the second mode are enabled, but the third operation mode is disabled. On the other hand, in the first status, the first operation mode is enabled, but the second and third operation modes are disabled. In the fourth status, the first, second, and third operation modes are disabled. The controller 1501 controls the above-described restriction of the operation mode.

Even in the same operation mode, processing of particular job data is enabled or disabled depending on processing conditions specified to be applied to that job data. That is, the controller 1501 enables or disables the operation depending on the processing conditions and depending on the status associated with date/time information in the above described manner.

This makes it possible to properly control the operation of the image forming apparatus 1401 having particular capabilities, modes, and functions, depending on the status associated with date/time information.

An example of the control process performed by the controller 1501 to control jobs in accordance with the enabled/disabled operation table shown in FIG. 19 is described below. Note that the control of jobs can be performed differently.

For example, in a case in which job data (a set of image data) requested by a user to be output is specified to be processed in the copy mode, processing of that job data is enabled regardless of the processing conditions specified to be applied to that job data and regardless of which one of the first to forth statuses associated with date/time information the image forming apparatus 1401 is in (see the "copy mode" section of the enabled/disabled operation table 1900 in FIG. 19).

In a case in which job data (a set of image data) requested by a user to be output is specified to be processed in the transmit/fax mode, if the image forming apparatus 1401 is in the first status associated with date/time information (hereinafter, such a situation will be described simply as "in the first status) and if the processing conditions specified to be applied to that job data includes at least one of the normal facsimile transmission mode (i.e., the file transmission mode, the store-into-box mode, and the normal reception mode), the processing of that job data is enabled. Furthermore, in the first status, in a case in which the processing conditions specified to be applied to the job data includes at least one of the confidential facsimile transmission mode, the e-mail transmission mode, the Internet facsimile transmission mode, and the confidential facsimile reception mode, although the processing of that job data is not disabled, a warning message is displayed on the display 1601 via the notification unit to inform the user of the above fact before the processing is executed. If the user agrees to execution of the job data, the job data is processed. In the first status, if the processing conditions specified to be applied to job data includes the timer transmission mode or the timer reception mode, the processing of that job data is disabled (see "transmit/fax mode" section of the enabled/disabled operation table 1900 shown in FIG. 19).

Similarly, the controller 1501 controls execution of processing of job data depending on the status, the mode, and the processing conditions specified to be applied to the job data.

The manner of controlling the execution of processing of job data in each status is summarized below.

(1) In the case in which the controller 1501 determines that the image forming apparatus 1401 is currently in the first status, the controller 1501 enables processing of job data according to the specified processing conditions if the job data is one of the following:

- job data specified to be processed in the copy mode, regardless of the processing conditions;
- job data specified to be processed in the transmit/fax mode and further specified to be processed in one of the following modes: normal facsimile transmission mode, store-into-box mode, direct transmission mode, and normal reception mode;
- job data specified to be processed in the printer mode and further specified to be processed in one of the following modes: single-sided/double-sided printing mode, sort mode, staple mode, scaled-down layout mode, scaled-up layout mode, edit mode, and watermark mode; and
- job data specified to be processed in the box mode and further specified to be processed in one of the following modes: store-into-box with no password, store-into-box with password, output-from-box, single-side/double-sided printing, sort mode, and stable mode.

In the first status, if the job data is one of the following, the controller 1501 displays a warning message on the notification unit such as the display 1601, and enables processing of the job data according to the specified processing conditions (a user is allowed to select whether to actually execute the processing of the job via the operation control unit 1503):

- job data specified to be processed in the transmit/fax mode and further specified to be processed in one of the following modes: confidential facsimile transmission, e-mail transmission, Internet facsimile transmission, and confidential facsimile reception;
- job data specified to be processed in the printer mode and further specified to be processed in the hold job mode, in which input job data is not immediately printed but temporarily stored on the hard disk 1508 so that the job data is printed by the printer 1507 when a print command is issued via the operation control unit 1503; and
- job data specified to be processed in the box mode and further specified to be output from a box with a password.

The controller 1501 disables processing when job data history information is displayed on the display 1601 or if the job data is one of the following:

- job data specified to be processed in the transmit/fax mode and further specified to be processed in one of the following modes: timer transmission, job completion notification, timer reception, and output of communication management report;
- job data specified to be processed in the printer mode and further specified to be processed in the secure print mode, in which input job data is not immediately printed but temporarily stored on the hard disk 1508 so that the job data is printed by the printer 1507 when authentication data is input by a user via the operation control unit 1503; and
- job data specified to be processed in the box mode and further specified to be automatically deleted when a predetermined period of time has elapsed since the job data was stored in a box or since the job data was output from the box and printed;

(2) In the case in which the controller 1501 determines that the image forming apparatus 1401 is currently in the second status, if job data is one of the following, the controller 1501 displays a warning message on the notification unit such as the display 1601 and enables processing of the job data according to the specified processing conditions:

- job data specified to be processed in the transmit/fax mode and further specified to be processed in one of the following modes: e-mail transmission, and output of communication management report; and
- job data specified that job history is displayed.

For job data other than the above, the controller 1501 enables processing.

(3) In the case in which the controller 1501 determines that the image forming apparatus 1401 is currently in the third status, the controller 1501 enables processing of job data regardless of the specified processing conditions.

(4) In the case in which the controller 1501 determines that the image forming apparatus 1401 is currently in the fourth status, if job data is one of the following, the controller 1501 displays a warning message on the notification unit such as the display 1601 and enables processing of the job data according to the specified processing conditions:

- job data specified to be processed in the transmit/fax mode and further specified to be processed in one of the following modes: normal facsimile transmission, e-mail transmission, Internet facsimile transmission, storage into a box, and direct transmission; and
- job data specified that job history is displayed.

In the fourth status, the controller 1501 disables processing of any of the followings

- job data specified to be processed in the transmit/fax mode and further specified to be processed in one of the following modes: confidential facsimile transmission, timer transmission, job completion notification, confidential facsimile reception; timer reception, and output of communication management report;
- job data specified to be processed in the printer mode and further specified to be processed in one of the following modes: secure print mode and hold job mode; and
- job data specified to be processed in the box mode and further specified to be output from a box with a password or automatically deleted.

In a case in which specified processing conditions are different from any of the above, the controller 1501 enables processing of that job data.

As described above, the controller 1501 restricts the operation mode in accordance with the enabled/disabled operation table shown in FIG. 19.

In the present embodiment, as can be understood from the examples described above, of the plurality of operation modes or processing conditions, those operation modes or processing conditions that need accurate date/time information (e.g., timer transmission, timer reception, and communication management report mode in the transmit/fax mode, and automatic delete mode in the box mode) are enabled when the image forming apparatus 1401 is in the second or third status, preferably only in the third status, and disabled when the image forming apparatus 1401 is in neither the second nor third status. Of the plurality of operation modes or processing conditions, those operation modes or processing conditions that do not need accurate date/time information are enabled even in the first or fourth status.

This makes it possible to use or perform the operation modes or processing conditions that need accurate date/time information (close to true date/time) in a highly reliable fashion. When the date/time information used by the image forming apparatus 1401 is detected to be unreliable, the operation modes or processing conditions that need accurate date/time information are restricted. This prevents job data that needs accurate date/time information from being performed in a situation in which although the date/time has been set, the date/time is not accurate enough. Thus, it becomes possible to prevent a problem that will occur if job data that needs accurate date/time information is performed on the basis of inaccurate date/time information. Furthermore, an additional advantage is that the status associated with date/time information is displayed on the display, and thus the user is informed of the status.

In the present embodiment, of the plurality of operation modes or processing conditions, those operation modes or processing conditions that are important and that need high security (e.g., secure print mode in the printer mode, store-into-box or output-from-box with password in the box mode) are enabled when the image forming apparatus 1401 is in the second or third status, preferably only in the third status, and disabled when the image forming apparatus 1401 is in neither the second nor third status. Of the plurality of operation modes or processing conditions, those operation modes or processing conditions that are not important and that do not need high security are enabled even in the first or fourth status.

Note that the manner of restricting the operation is not limited to that described above, but the rule(s) of restricting the operation may be determined depending on the features and capabilities of the image forming apparatus 1401, and may be described in an enabled/disabled operation table similar to that shown in FIG. 19.

When a plurality of processing conditions are specified for the same job data, if the plurality of processing conditions include a condition that is not allowed in the enabled/disabled operation table shown in FIG. 19 (such a condition is denoted by symbol x) and a condition that is allowed (such a condition is denoted by symbol ○), the determination as to whether to enable or disable processing of that job data may be made on the basis of the unallowable condition such that processing of the job data is disabled if the plurality of processing conditions include any unallowable condition. The determination may be made such that although processing in the unallowable mode of the plurality of specified processing conditions is disabled, processing in an allowable mode of the plurality of specified processing conditions is enabled. For example, in the first status, for job data specified to be processed in the box mode, if both the output-from-box with no password (allowable in the table shown in FIG. 19) and the automatic delete mode (unallowable in the table shown in FIG. 19) are specified, the controller 1501 may control the printer unit 1507 and the hard disk 1508 in either such a manner that although the job data is allowed to be output from the box and printed, the job data is not automatically deleted or such a manner that the outputting of the job and the automatic deleting are disabled. In any case, the controller 1501 controls associated units or parts such that any unallowable processing condition is not permitted.

Disabling of processing can be accomplished, for example, as follows. When processing conditions to be applied to job data are specified by a user via the operation control unit 1503, the specified processing conditions are ignored and associated units (e.g., the scanner unit 1502, the data processing unit 1506, the external communication unit 1505, the printer unit 1507, and/or the hard disk 1508,) are controlled such that they do not operate. Another method is to delete operation control keys (i.e., soft keys on the touch panel) necessary in specifying the processing conditions from the operation control screen. Alternatively, such operation control keys may be displayed in the form of dot meshing or grayed-out, and those operation control keys are disabled (i.e., operation on any such key by a user is ignored). Note that in the present embodiment, there is no particular restriction on the manner of disabling processing, and any method of disabling processing can be employed.

In the present embodiment, as described above, when the operation control screen is displayed, information indicating the current status associated with date/time is displayed so that the date/time information service can be used in the most effective manner. Depending on the current status associated with date/time information, the plurality of operation modes or capabilities of the image forming apparatus 1401 are restricted such that a user can use the image forming apparatus 1401 in a very convenient and effective manner. The present embodiment of the invention is very useful, particularly when the embodiment is applied to a multifunction apparatus having a capability of providing service using date/time information.

Although in the embodiment described above, the invention is applied to the image forming apparatus 1401 to control or restrict its operation mode using the controller 1501, the invention may also be applied to the client computer 1403 or 1404 or the multifunction digital device 1405 that remotely uses the image forming apparatus 1401 such that operation control screens are displayed and operation modes are restricted in a similar manner.

For example, displaying of information and/or the operation mode of an external device (information processing apparatus), such as the client computer 1403, can be controlled or restricted by controlling the printer driver and/or the status monitor thereof as described below.

In the client computer 1403, when a printer driver setting screen for use in setting the image forming apparatus 1401 is displayed on the display of the client computer in response to an operation performed by a user, or when a status monitoring function is executed on the client computer 1403 in order to detect the status of the image forming apparatus 1401, a status request command is transmitted from the client computer 1403 to the image forming apparatus 1401 via a communication medium such as the network 1400 shown in FIG. 14.

In response to receiving the status request command, the image forming apparatus 1401 returns status information indicating the current status, including the status associated with date/time information of the image forming apparatus 1401, to the client computer 1403. The status information may include only the time status information or may include additional operation status information indicating whether the image forming apparatus 1401 is performing printing, or is in an idle status, or has an error, status information associated with presence/absence and/or the number of sheets in the sheet feeder or the output sheet tray, and/or status information indicating the presence/absence or the amount of toner or other consumable materials.

Figure 20B:
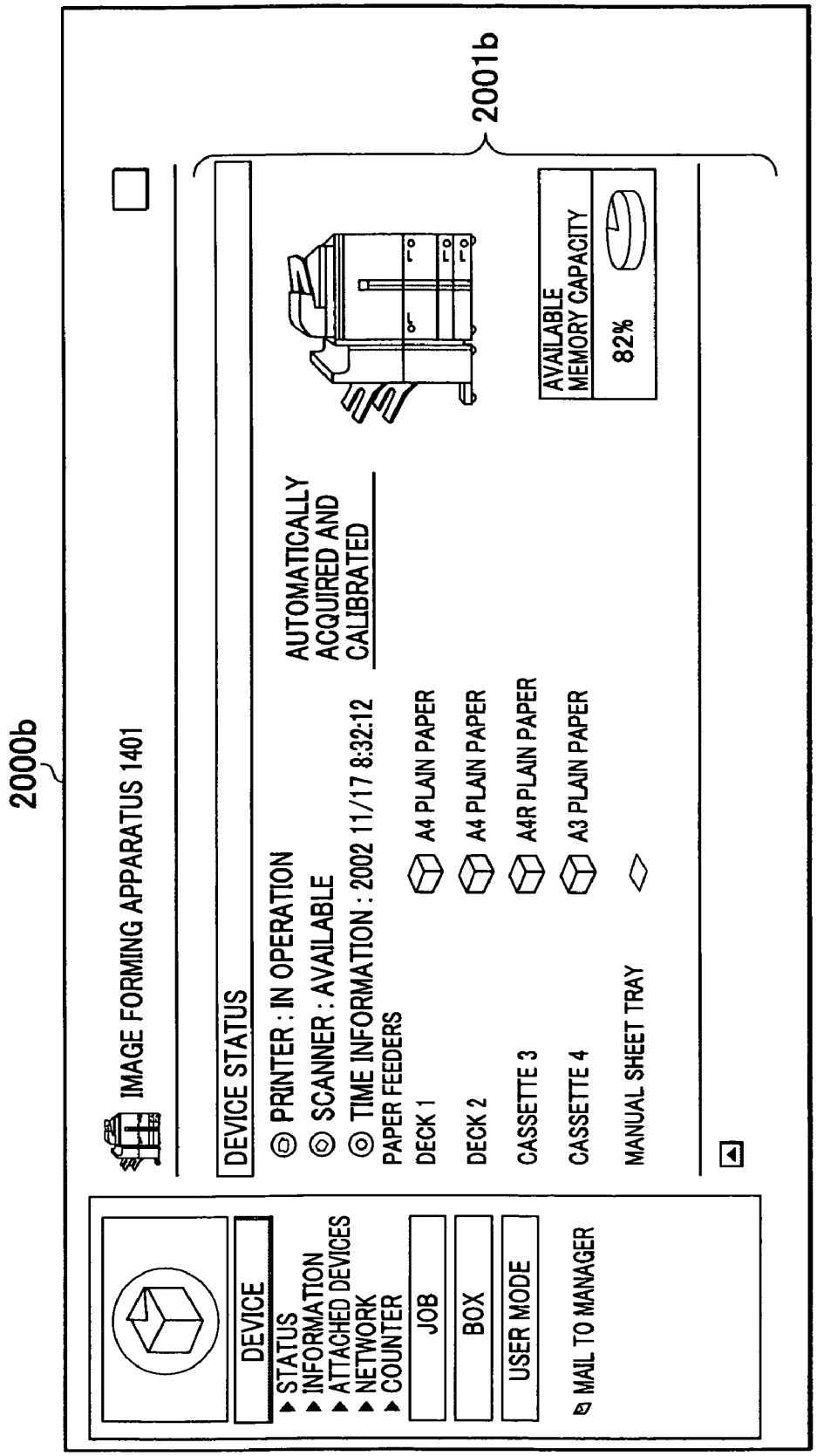
FIG. 20 is a diagram showing an operation control screen according to an embodiment of the present invention.

In the client computer 1403, the status information indicating the current status of the image forming apparatus 1401, acquired from the image forming apparatus 1401, is displayed on the display of the client computer 1403 in a status display area similar to the status display areas 1703b to 1703e of FIGS. 17B to 17E. The client computer 1401 may display the current status associated with date/time information used by the image forming apparatus 1401 as depicted in FIG. 20A. As shown in FIG. 20A, a printer driver setting screen 2000a for use in setting the image forming apparatus 1401, including a device status display area 2001a or a printing condition setting area, is displayed on the display of the client computer 1403. Status information, including at least status information associated with date/time information used by the image forming apparatus 1401, is displayed in the device status display area 2001a. Alternatively, as shown in FIG. 20B, a status monitor screen 2000b, including a device status display area 2001b, is displayed under the control of the controller of the client computer 1403 on the display of the client computer 1403. Device status information, including at least status information indicating the current status associated with date/time information used by the image forming apparatus 1401, is displayed in the device status display area 2001b.

As described above, the status information can be displayed in many ways. In any case, it is required that the status information be displayed such that a user at the client computer 1403 is informed as to which one of the first to fourth status associated with date/time information the image forming apparatus 1401 is currently in. Alternatively, the status information may be provided via voice notification by using a voice output unit (not shown) of the client computer 1403.

Restrictions can be imposed on job data output from the client computer 1403 in a similar manner as described above. That is, processing of the job data is enabled, disabled, or enabled with warning in accordance with the disabling/enabling rule in the printer mode described in the table 1900 shown in FIG. 19.

This makes it possible for an external device to display status information and restrict the operation. That is, advantages of the present invention can be achieved not only in the image forming apparatus, but also in external devices.

Both the displaying of status information and the restriction on the operation may be accomplished by an external device, such as the client computer 1403, by using a printer driver or a status monitor. Displaying only either status information or restriction on the operation may be accomplished, while the controller 1501 of the image forming apparatus may display whatever is not displayed by the external device.

The above embodiment describing displaying status information and restricting operation can be applied not only to the image forming apparatus 1401, but also to another device that uses date/time information and has a plurality of operation modes and the capability of performing a plurality of processes, such as a printer, a scanner, a portable telephone, or a digital camera.

Referring to a memory map shown in FIG. 21, data processing programs that are read and executed by an electronic device according to the present invention are described below.

FIG. 21 is a memory map of a storage medium in which data processing programs (i.e., programs for executing processes of embodiments described above with reference to flow charts, programs for displaying various operation control screens, etc.) readable by the electronic device according to the present invention are stored.

Although not shown in FIG. 21, in some cases, information necessary for management of the programs stored in the storage medium, such as information indicating versions of programs or names of authors of programs, is also stored in the storage medium. Furthermore, information, such as icons for identifying the respective programs, depending on the OS executed on the electronic device that reads the programs may also be stored in the storage medium.

Furthermore, data associated with the respective programs are stored and managed in directories in the storage medium. In some cases, a program used to install a program onto a computer is also stored in the storage medium. In a case in which a program to be installed onto the computer is stored in a compressed fashion, a program used to decompress the program is also stored.

The functions or the capabilities described above with reference to FIGS. 2, 7, 8, 11, and 12, and/or the capability of displaying various kinds of information on operation control screens or the like may be implemented by programs installed from the outside onto a host computer. The present invention can be applied to a system in which information including such programs is supplied to an output device from a storage medium such as a CD-ROM, flash memory, floppy disk (FD), or from an external storage medium via a network.

The objects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of invention and thus the storage medium storing the program code falls within the scope of present invention.

Specific examples of storage media that can be preferably employed in the present invention to supply the program code include a floppy disk, hard disk, optical disk, magneto-optical disk, CD-ROM, CD-R, magnetic tape, nonvolatile memory card, ROM, and EEPROM.

Furthermore, the scope of the present invention includes not only such an apparatus in which the functions of any embodiment described above is implemented simply by reading and executing a program code on a computer, but also an apparatus in which a part of or the whole of process is performed by a OS (operating system) running on the computer in accordance with the program code.

Furthermore, the scope of the present invention also includes an apparatus in which a program code is transferred once from a storage medium into a memory provided in a function extension board inserted in a computer or provided in a function extension unit connected to the computer, and then a part of or the whole of process is performed by a CPU or the like in the function extension board or the function extension unit in accordance with the program code thereby implementing the functions of any embodiment described above.

Although the present invention has been described above with reference to preferred embodiments, the present invention is not limited to those specific embodiments described above, but various modifications, including combinations of embodiments, are possible.

As described above, the present invention provides great advantages. That is, by applying the invention to an electronic device having a capability of providing service using date/time information, it becomes possible to inform a user whether the data/time information used by the electronic device is reliable enough, and it becomes possible to permit the electronic device to operate only in a desirable status associated with date/time information, thereby preventing the electronic device from operating in an undesirable status.

Even when the operation of the electronic device is not restricted, the usage history information makes it possible to make management associated with date/time more reliable.

The present invention may also be applied to time setting service using a radio wave or a telephone line. However, in the case in which only the time information is adjusted using time information provision service, the date (year, month and day) cannot be corrected when the date is incorrectly set. The device can be used even in such a situation, if setting that cannot be guaranteed such as the date (year, month and day) is regarded as correct. In the present embodiment, there is no specific restriction on the details of the time information provision service.

In a device that uses the date/time information service server 14, the degree of reliability or accuracy of the date/time information used by that device is expressed by the value of the parameter STS. This makes it possible to inform a user how accurate the information is that indicates the date/time of operation of the device.

By exchanging the parameter STS with another device, it becomes possible to perform operation on the basis of more reliable date/time information.

The present invention also makes it possible to restrict the operation of a device in a manner specified by a user when it is undesirable to use a device in a status in which date/time information is not accurate enough.

In the embodiments described above, information is provided to a user by using a notification unit, such as a display, a voice output unit, or an indictor, to inform the user which one of the first to fourth statuses associated with date/time information the device is in. Alternatively, the printer unit 1507 may print the status information on paper in order to inform a user of the status. In this case, the printer unit 1507 also serves as the notification unit. That is, any type of notification unit can be used, as long the notification unit is capable of informing a user of the current status of the device in terms of date/time information. More specifically, as with the operation control screens described above, a notification message may be displayed on the notification unit to inform a user whether the date/time information is based on first-type date/time data or second-type date/time data, whether the displayed date/time data has been set manually or has been calibrated, or to inform the user that date/time has not been set yet or that calibration is necessary.

Furthermore, in an electronic device having the capability of measuring the time on the basis of the first date/time data acquired via the date/time information service or on the basis of the second date/time information set by a user, the reliability of the date/time information is evaluated on the basis of the history of setting the date/time and the evaluation result is displayed on a display. Furthermore, data processing is enabled or disabled depending on the degree of reliability (status) of the date/time information. From the status information associated with date/time information displayed on the display, the user can easily know the reliability of the date/time information, and the user can determine whether to perform data processing depending on the status associated with date/time.

In a communication process between devices having the capability of setting date/time using the date/time information provision service, date/time information is exchanged and compared with date/time information used in each device. Depending on the comparison result, the date/time information is replaced with more reliable date/time information. That is, each time communication between two devices is performed, date/time information used in each device is evaluated, and data processing is performed on the basis of the more reliable date/time information.

In the present invention, not only is status information displayed to inform the user of the current status of the device in terms of time information, but the operation control screen is also displayed in a manner taking into account that the time service can be provided and the device has the plurality of operation modes, so that the user can easily use the various capabilities or functions of the device by inputting data or issuing a command via the operation control screen that is switched/modified depending on the operation mode. This makes it possible to effectively use the capabilities or functions of the device using the time service, and a significant improvement in operability is achieved. In particular, the present embodiment of the invention is very useful when it is applied to a multifunction device having the time service capability.

Furthermore, in the present invention, when the operation control screen is displayed, information indicating the current status associated with date/time is displayed so that the date/time information service can be used in the most effective manner. Depending on the current status associated with date/time information, the plurality of operation modes or capabilities of the image forming apparatus 1401 are restricted such that a user can use the image forming apparatus 1401 in a very convenient and effective manner. This is very useful, particularly when the invention is applied to a multifunction apparatus having a capability of providing service using date/time information.

In the present invention, the control process can be performed not only a device that uses the time information service, but also by another external device such as a computer that has the capability of performing data communication with the former device and that controls the former device from a remote location. That is, the present invention provides the advantages described above not only to a user who directly uses a device having the time service capability, but also to a user who indirectly uses the device from a remote location. Thus, the present invention is very useful in many types of apparatuses and many types of systems in which time information service is used.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An electronic device having a capability of performing data communication with a server that provides date/time information provision service, comprising:

a display unit adapted to display moans for displaying date/time information;

a time measurement unit adapted to measure means for measuring time on the basis of first time information acquired from the date/time information provision service or on the basis of second time information set by a user;

a storage unit adapted to store means for storing data indicating a time-setting status of the time measurement unit; and a process control unit adapted to means for controlling execution of data processing in accordance with the time-setting status displayed by the display control moans allow execution of a predetermined process when the data stored in the storage unit indicates the time-setting status on the basis of the first time information and to prohibit the execution of the predetermined process when the data stored in the storage unit indicates the time-setting status on the basis of the second time information.

2. The electronic device according to claim 1, further comprising:

a display control unit adapted to display, on a display, the time-setting status according to the data stored in the storage unit.

3. The electronic device according to claim 1, wherein the process control unit allows execution of a process to transmit image data to an external apparatus when the data stored in the storage unit indicates the time-setting status on the basis of the first time information, and prohibits the execution of the process to transmit image data to the external apparatus when the data stored in the storage unit indicates the time-setting status on the basis of the second time information.

4. The electronic device according to claim 1, wherein the process control unit allows execution of a process to print received image data when the data stored in the storage unit indicates the time-setting status on the basis of the first time information, and prohibits execution of the process to print the received image data when the data stored in the storage unit indicates the time-setting status on the basis of the second time information.

5. The electronic device according to claim 1, further comprising:
a log data storage unit adapted to store log data indicating a process executed in the electronic device, wherein information indicating the executed process is associated with the date/time information indicating time when the process was executed, in the log data.

6. The electronic device according to claim 1, wherein the electronic device is a multi function image processing device having a scanner and a printer.

7. A method of controlling an electronic device having a capability of performing data communication with a server that provides date/time information provision service, comprising the steps of:
displaying date/time information;
measuring time with a time measurement unit on the basis of first time information acquired from the date/time information provision service or on the basis of second time information set by a user;
storing data indicating a time-setting status of the time measurement unit; and
controlling execution of data processing to allow execution of a predetermined process when the stored data indicates the time-setting status on the basis of the first time information and to prohibit the execution of the predetermined process when the data stored in the storage unit indicates the time-setting status on the basis of the second time information.

* * * * *